April 18, 1939. J. T. DAVIDSON Re. 21,051

ACCOUNTING MACHINE

Original Filed Aug. 2, 1937 7 Sheets-Sheet 1

John T. Davidson
Inventor

By Hearl Benst
His Attorney

April 18, 1939. J. T. DAVIDSON Re. 21,051

ACCOUNTING MACHINE

Original Filed Aug. 2, 1937 7 Sheets-Sheet 2

Inventor
John T. Davidson
By
Earl Benst
His Attorney

April 18, 1939.
J. T. DAVIDSON
ACCOUNTING MACHINE
Original Filed Aug. 2, 1937
Re. 21,051
7 Sheets-Sheet 3
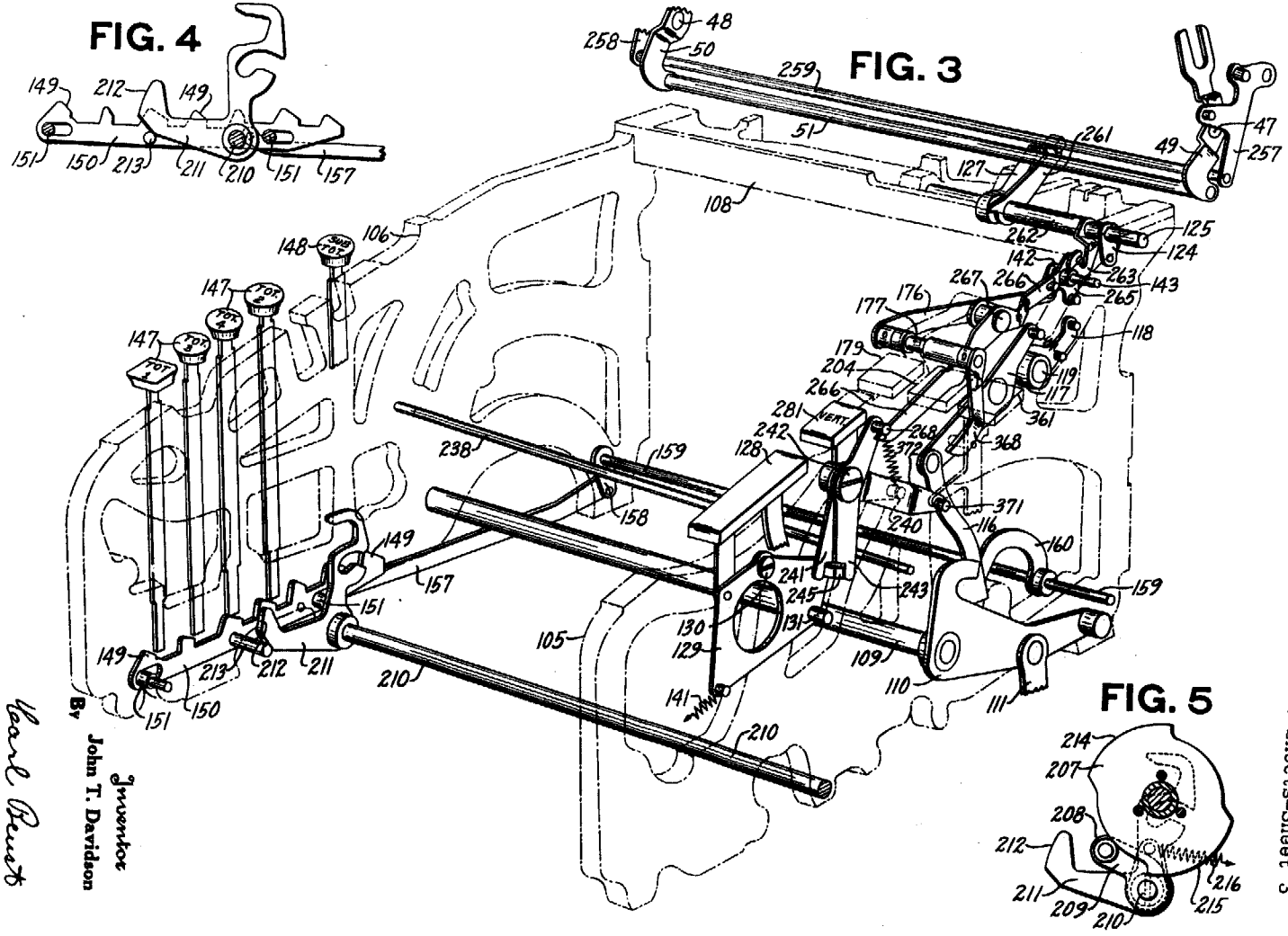
Inventor
John T. Davidson
By
Earl Beust
His Attorney April 18, 1939.

J. T. DAVIDSON

ACCOUNTING MACHINE

Original Filed Aug. 2, 1937

Re. 21,051

7 Sheets-Sheet 4

Inventor
John T. Davidson

By

Pearl Beust

His Attorney

April 18, 1939. J. T. DAVIDSON Re. 21,051

ACCOUNTING MACHINE

Original Filed Aug. 2, 1937 7 Sheets-Sheet 5

Inventor
John T. Davidson
By
Pearl Bent
His Attorney

April 18, 1939. J. T. DAVIDSON Re. 21,051

ACCOUNTING MACHINE

Original Filed Aug. 2, 1937 7 Sheets-Sheet 6

Inventor
John T. Davidson
By
Karl Benst
His Attorney

April 18, 1939. J. T. DAVIDSON Re. 21,051
ACCOUNTING MACHINE
Original Filed Aug. 2, 1937 7 Sheets-Sheet 7
FIG. 15
FIG. 14
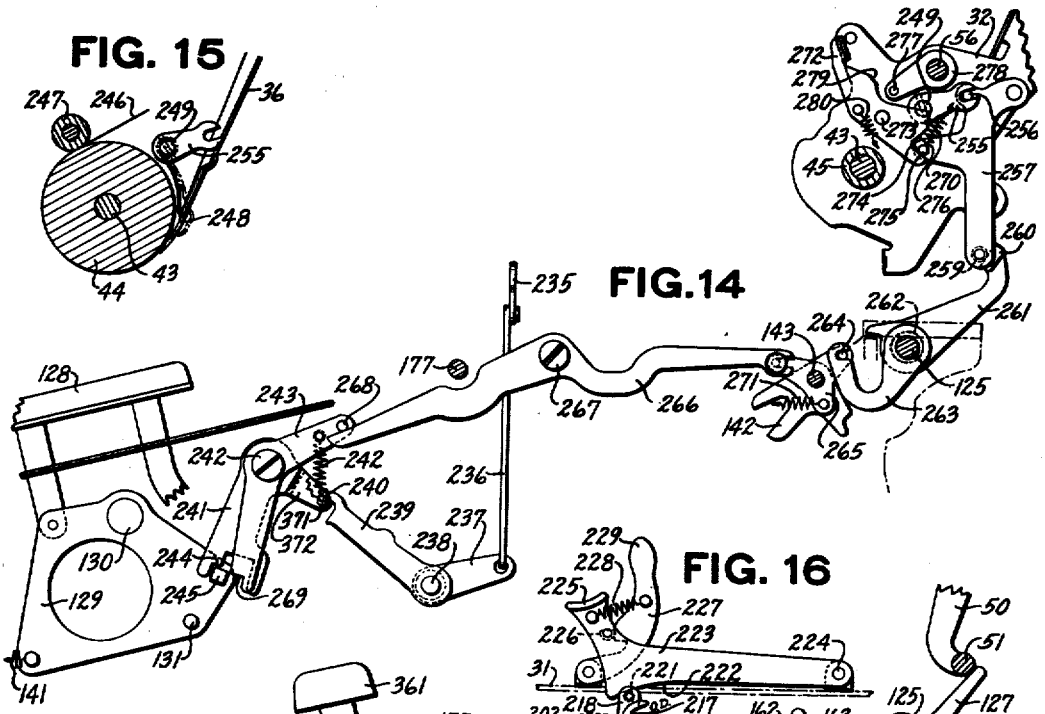
FIG. 16
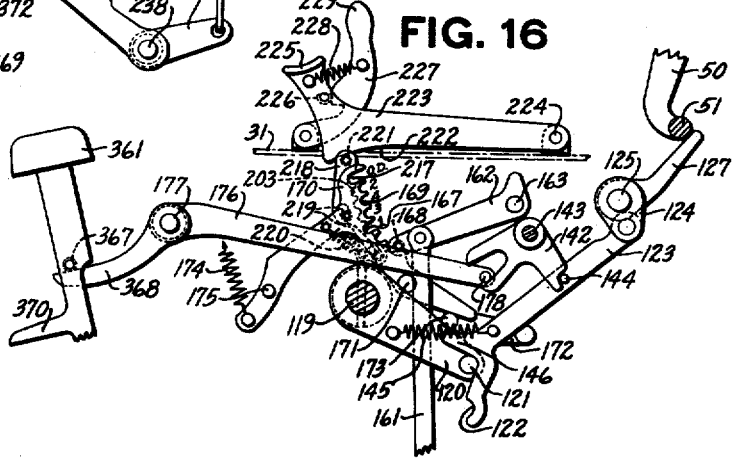
FIG. 17
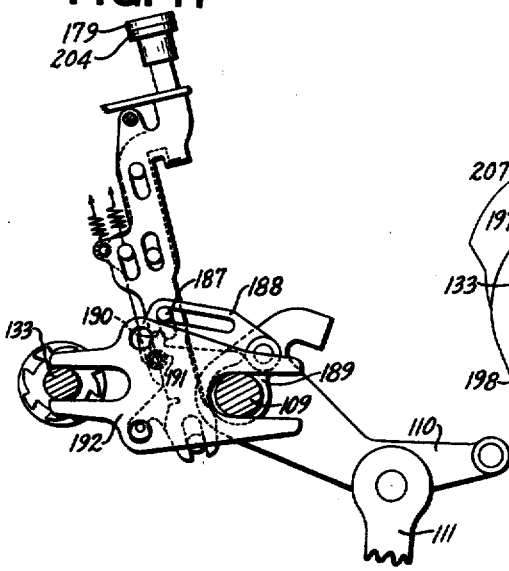
FIG. 18
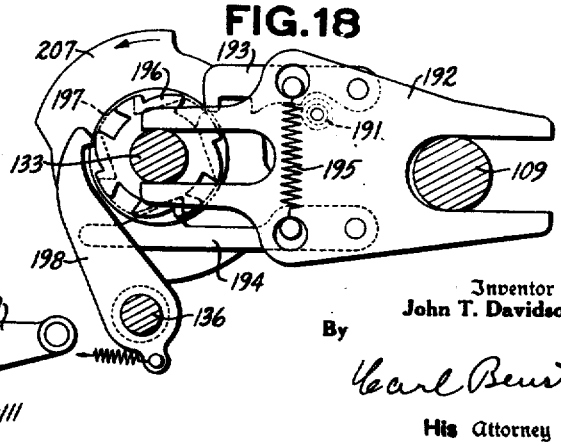
Inventor
John T. Davidson
By
Earl Benst
His Attorney Reissued Apr. 18, 1939

Re. 21,051

UNITED STATES PATENT OFFICE 21,051

ACCOUNTING MACHINE

John T. Davidson, Dayton, Ohio, assignor to The National Cash Register Company, Dayton, Ohio, a corporation of Maryland Original No. 2,138,482, dated November 29, 1938, Serial No. 156,865, August 2, 1937. Application for reissue February 4, 1939, Serial No. 254,721

56 Claims. (Cl. 197—128)

This invention relates to accounting and analogous machines and is particularly directed to throat-opening devices for the front feed carriages of such machines.

In order to expedite the handling of complex business systems, most present-day accounting machines are provided with a front feed traveling carriage in which the platen may be rocked from printing position to a more accessible position for the insertion of record material therearound. The throats of such front feed platens may be opened automatically or manually, and when opened permit the record material, which generally consists of wide ledger sheets, to be inserted at the front of the platen and pushed there-around until the proper line of said ledger sheet is located in relation to the printing mechanism by means of a line-finding device, which moves to effective position when the throat is opened. Obviously, ledger sheets upon which entries have been made may be simply pulled from the open throat of the front feed platen.

In large business concerns hundreds of ledger sheets are handled during a single business period and to facilitate the handling of these ledger sheets, the accounting machines are provided with automatic means for opening the throat of the front feed platen after the entries have been made upon the ledger sheet. In certain types of accounting machines the moving of the traveling carriage into a certain columnar position causes the throat to open automatically. In the machine embodying the instant invention the moving of the traveling carriage to certain columnar positions has no control over the throat opening mechanism other than the actuation of a latch which locks the releasing mechanism against operation when the carriage is out of any one of its columnar positions. The present invention is directed to automatic means under control of the machine control keys for causing the throat to open automatically, depending upon which control key is depressed. Any number of control keys may be arranged to cause the throat to open automatically. Manipulative means is provided for rendering the control of the throat opening by the control keys ineffective.

In addition to the above automatic means for opening the throat of the front feed platen, it is also desirable to be able to open the throat at will, and to this end manipulative means is provided for causing the throat to open at the will of the operator.

Therefore it is broadly an object of this invention to provide means for automatically opening the throat of the front feed platen, said means not being dependent upon the columnar positioning of the traveling carriage, nor dependent upon said carriage in any way.

A more specific object is the provision of means rendered effective by the depression of certain control keys for causing the throat of the front feed carriage to open automatically.

Another object of this invention is to supply means whereby the control keys may be rendered ineffective to control the opening of the throat.

Still another object of this invention is to furnish means, independent of the control keys, for causing the throat of the traveling carriage to open at will, irrespective of the columnar position of said traveling carriage.

With these and incidental objects in view the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1A is a perspective view of one set of pressure rollers for holding record material in contact with the platen roll.

Fig. 3 is a perspective view of the mechanism that controls the opening of the throat of the front feed carriage.

In views such as Fig. 3, showing the framework in phantom, where the dot and dash lines of the framework do not show in back of the full-line parts, it indicates that such parts are in front of the framework.

Fig. 4 is a detail view of the symbol type sector control bar and the cam arm associated therewith, which positions said bar in overdraft operations.

Fig. 5 is a detail view of the cam and the arm associated therewith which control the engaging of the overdraft storage device with the actuators.

Figure 6:
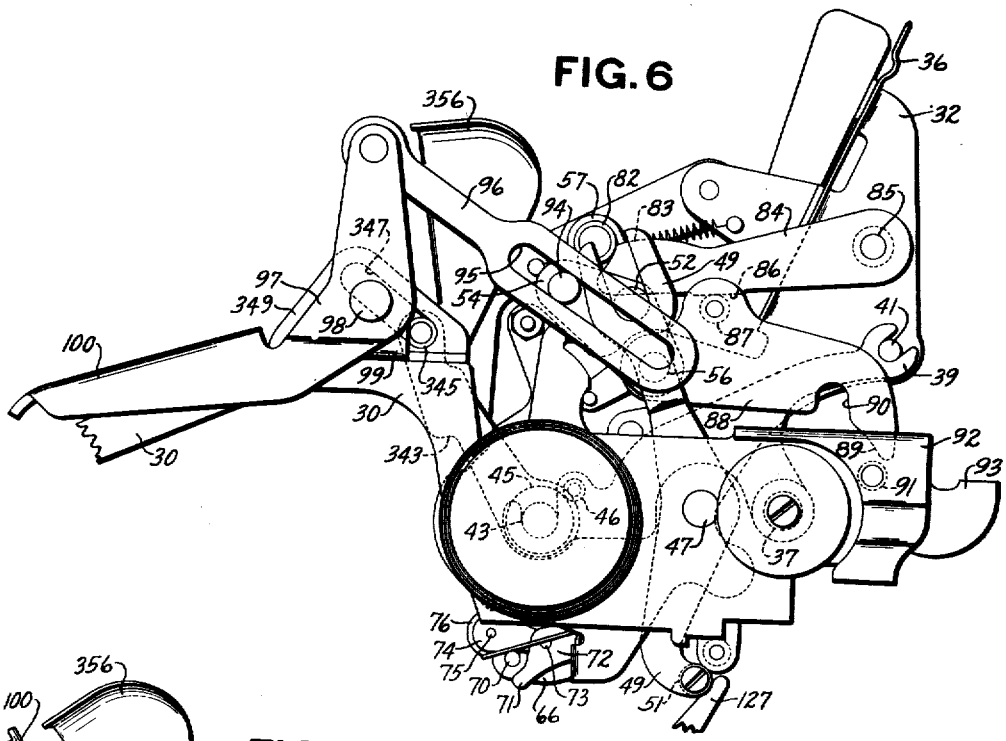

Fig. 6 is a right-hand end view of the traveling carriage showing the throat closed.

Figure 7:
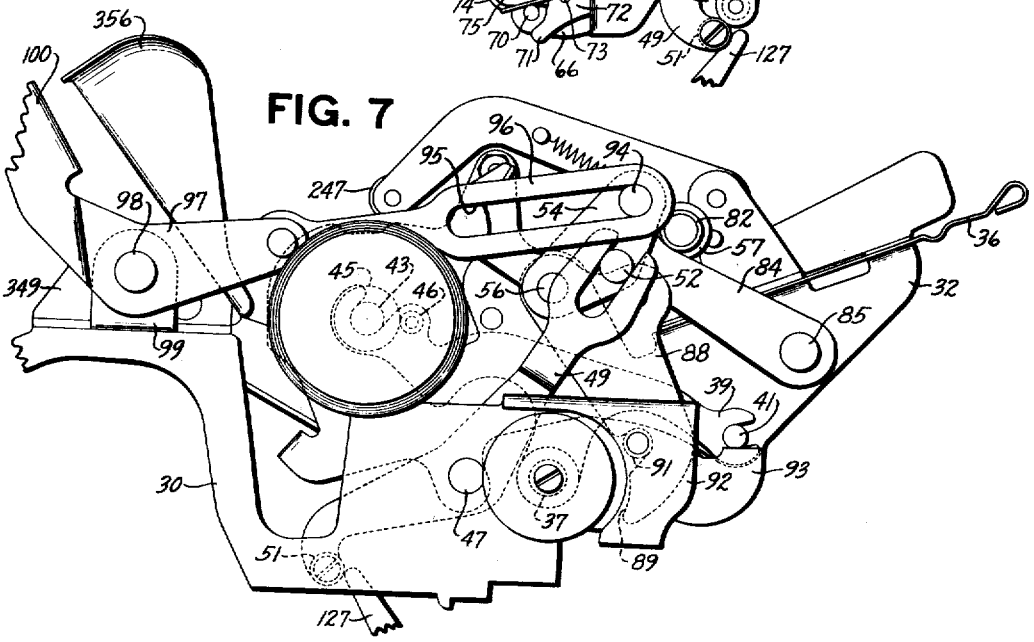

Fig. 7 is a right-hand end view of the traveling carriage showing the throat open.

Figure 8:
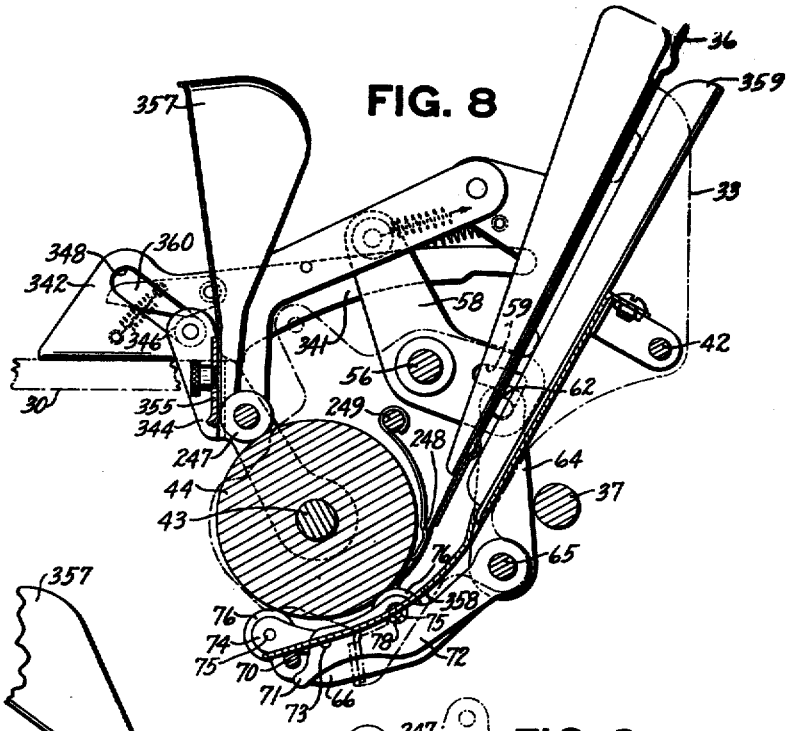

Fig. 8 is a sectional view of the traveling carriage showing the throat closed.

Figure 9:
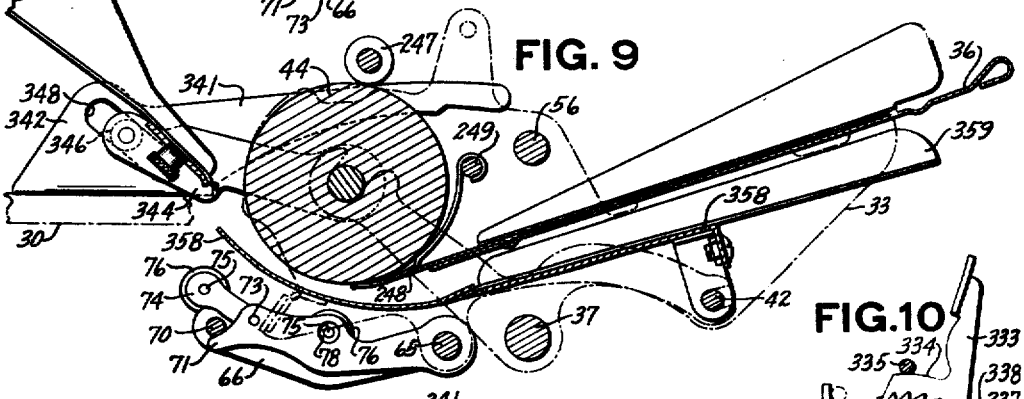

Fig. 9 is a sectional view of the traveling carriage showing the throat open.

Figure 10:
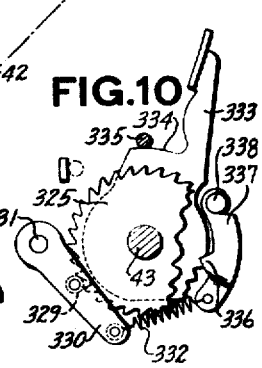

Fig. 10 is a fragmentary end view of the ratchet and associated mechanism that controls the line-spacing of the platen roll.

Figure 11:
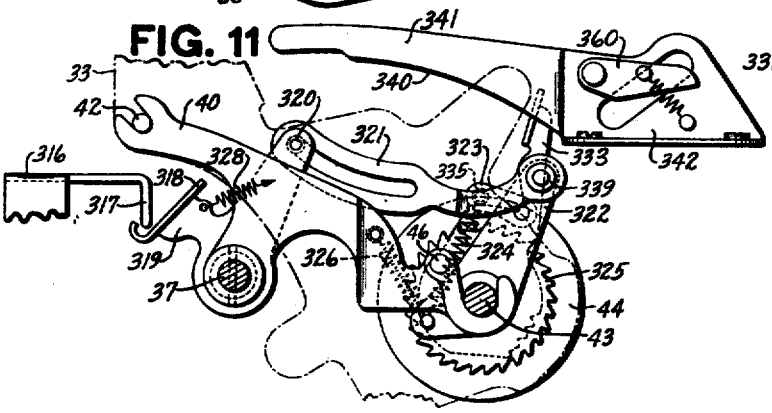

Fig. 11 is a detail view of the mechanism that automatically line-spaces the platen roll.

Figure 12:
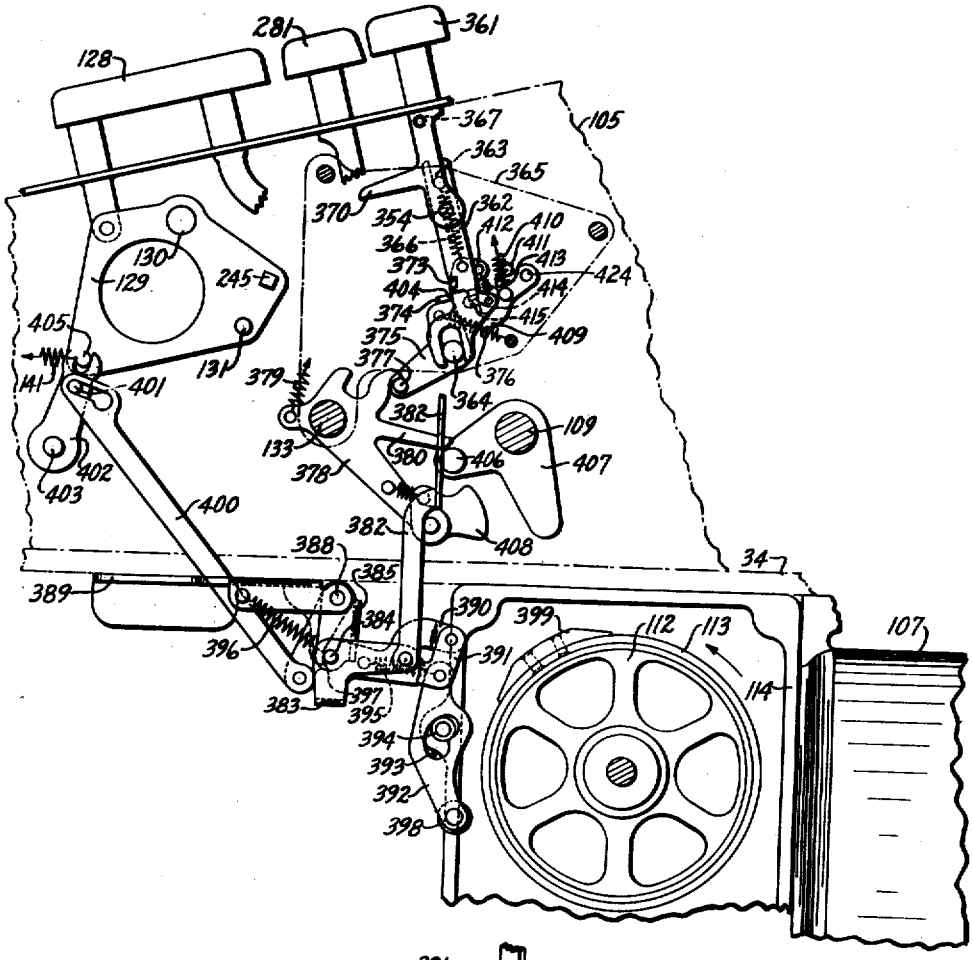

Fig. 12 is a right side elevation of a portion of the machine illustrating the mechanism that causes the machine to operate and simultaneously renders the throat opening mechanism effective.

Figure 13:
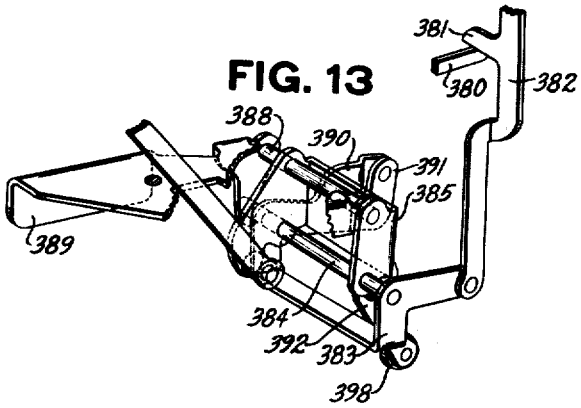

Fig. 13 is a perspective view showing in detail a part of the mechanism illustrated in Fig. 12.

Fig. 14 is a detail view of the mechanism that locks the machine against operation when the throat of the front feed carriage is opened, or when certain of the record material has been exhausted.

Fig. 15 is a sectional view of the platen showing the feeler mechanism that locks the machine against operation when certain of the record material is exhausted.

Fig. 16 is a detail view of the mechanism that controls the opening of the throat of the front feed carriage.

Fig. 17 is a detail view of the overdraft key and a part of the mechanism associated therewith to control operation of the machine in overdraft operations.

Fig. 18 is a detail view of the mechanism that drives the ovedraft control shaft and cams in overdraft operations.

*General description*

The instant invention is shown applied to the well known Ellis type of accounting machine which has a plurality of numeral keys, the depression of which positions slidable racks or actuators for the several totalizers and the printing mechanisms.

In total and sub-total operations the totalizer wheels of the selected totalizer position the actuators commensurate with the amount of standing in said totalizer. The actuators in turn position the printing segments proportionate to the amount on said totalizer wheels.

Considering that the Ellis machine is well known in the art, that is, its basic principles of operation, it is believed unnecessary to go into a detailed description thereof at this time. Therefore, in this specification only the mechanism pertinent to the instant invention will be described in detail. However, for a detailed description of the entire machine reference may be had to the following United States Patents Nos. 1,197,276 and 1,197,278 issued September 5, 1916, to Halcolm Ellis; No. 1,203,863, issued November 7, 1916, to Halcolm Ellis; No. 1,819,084, issued August 18, 1931, to Emil John Ens, and No. 2,038,717 issued April 28, 1936, to R. A. Christian.

In the present-day business world, accounting or bookkeeping machines of the Ellis type are used by large mercantile concerns in the balancing of individual charge accounts, by banking establishments in the balancing of individual checking accounts, and by various other businesses in various ways. As a general rule it is the practice of such business concerns to balance active accounts daily.

Using a bank as one example, the system usually employed provides a ledger sheet for each depositer upon which the daily balancing of his account takes place. A record of the day's work is generally kept on a journal sheet which, together with its superimposed carbon paper, is first wound around the platen roll. As the journal sheet remains in the machine during the entire day's run, it is inserted at the rear of the platen and wound there-around by means of pressure rolls until its top edge passes beyond the printing line. As there are generally a large number of accounts to balance and consequently a large number of ledger sheets to be handled, it is necessary to provide means whereby the ledger sheets may be quickly inserted in the machine, located in proper relation to the printing line, and after the balancing of a particular account is completed, the ledger sheet may be quickly removed from the machine with the least amount of effort consistent with speed and accuracy.

To accomplish this result the machine embodying the instant invention is equipped with a traveling carriage having a front-feed throat which is opened for the insertion of ledger sheets when the platen is automatically rocked or tilted upwardly away from printing position to front feeding position. Simultaneously with the opening of the throat the combined front-feed guide and line finding device is rocked into guiding position, and after the platen has completed its movement away from printing position the pressure rolls are automatically disengaged therefrom to permit the ledger sheet, which has been audited, to be removed from the machine. Thereafter another ledger sheet is inserted in the open throat and pushed around the platen roll until the proper line is located, after which the throat is closed by a hand lever conveniently located on the traveling carriage frame.

Insertion and removal of ledger sheets does not disturb the journal sheet and its superimposed carbon, as they are held in contact with the platen by auxiliary pressure rolls which are not released when the platen is rocked to open throat position.

An interlocking mechanism is provided between the platen and the machine release mechanism which prevents operation of the machine when the platen is in open-throat position. A feeler mechanism cooperating with this same interlocking mechanism locks the machine against operation when the end of the journal sheet nears the printing line and serves as a warning to the operator that almost all the usable space of the journal sheet has been exhausted.

The machine embodying the instant invention is provided with a conventional tabulating mechanism for controlling the positioning of the traveling carriage in relation to the several columns on the ledger sheet. The usual vertical feeding mechanism is employed to rotat the platen to line-space the record material.

The mechanism that operates the machine also operates the throat-opening mechanism. Depressing certain of the control keys causes the throat-opening mechanism to be connected to the machine operating mechanism, whereupon operation of the machine automatically opens the throat of the traveling carriage. In the present machine the control keys are located in a row at the left of the keyboard and depressing any one of these keys positions a slidable control bar, which in turn positions a printing sector to print a symbol characteristic of the type of operation being performed. The control keys also position an arm commensurate with the postion of the symbol printing sector, after which an aligning arm, having a notch therein for each position of the symbol sector, engages the arm to lock the sector against displacement. If it is desired that a certain control key cause the throat to open, the aligning notch in the aligning lever corresponding to that particular key is made deeper than the other aligning notches, thereby permitting additional aligning movement of the lever. This additional movement of the aligning lever causes the throat-opening mechanism to be connected to the machine operating mechanism upon subsequent operation of the machine and consequently the throat of the traveling carriage opens automatically. Any number of the control keys may be arranged to cause the throat of the carriage to open in the manner set out above. The overdraft key also positions the control bar to position the symbol sector so that an overdraft symbol will be printed. Consequently this key may also be arranged to cause the throat of the carriage to open.

A manipulative lever is provided for shifting a plate, mounted upon the aligning lever to partially close the deep alining notches in said lever to render the control keys and the overdraft key ineffective to open the throat of the carriage. This manipulative lever is provided with a latch for retaining said lever in effective position when desired.

The machine embodying the present invention is also provided with an auxiliary motor bar, depression of which, in addition to setting the machine in motion, also causes the throat-opening mechanism to be connected to the machine operating mechanism, thereby causing the throat to be opened automatically.

The mechanisms outlined above, for automatically opening the throat are not dependent in any way upon the columnar or tabulated position of the traveling carriage.

When the traveling carriage reaches the terminus of its tabulating movement the carriage return mechanism is rendered effective and returns said carriage to starting position. The traveling carriage may also be returned from predetermined columnar positions to starting position or to predetermined columnar positions by means of several carriage return bars conveniently located on the right side of the machine.

Mechanism pertinent to the instant invention will now be described in detail.

*Detailed description*

Referring to Figs. 1, 2, 6 and 8, a traveling carriage 30 is mounted to slide laterally upon ways on a machine case 31, which encloses the mechanism of the machine and is secured to a machine base plate 34. The framework of the carriage 30 supports a platen carrying frame composed of end plates 32 and 33 connected by tie rods (not shown) and a rear table 36 for the journal sheet. Secured in the framework of the carriage 30 is a rod 37 having pivoted thereon platen carrying frame arms 39 and 40, the upper ends of which are bifurcatefd to embrace support studs 41 and 42 for the table 36. Said studs are secured in the plates 32 and 33. The lower ends of the arms 39 and 40 are hook-shaped to receive a platen shaft 43 carrying a platen roll 44. Loose on either end of the platen shaft 43 are spring pushed collars 45 adapted to cooperate with studs 46 in the arms 39 and 40 to retain the platen shaft 43 in the hooked ends of said arms. Thus it is evident that the platen is removably and pivotally mounted within the traveling carriage framework by the arms 39 and 40 and the collars 45.

Secured in opposite ends of the framework of the carriage 31 (Figs. 3 and 6) are studs 47 and 48 upon which are pivoted arms 49 and 50, respectively, the lower ends of which are connected by a rod 51. The upper ends of the arms 49 and 50 are bifurcated to receive studs 52, only one here shown, secured in arms 54 and 55, respectively, fast on a shaft 56 journaled in the end plates 32 and 33 of the platen frame. Also secured on the shaft 56 (Figs. 6 and 8) are arms 57 and 58, the lower end of each having a cam slot 59 arranged to cooperate with rollers 61 and 62 carried by arms 63 and 64 secured on a shaft 65 journaled in the end plates 32 and 33.

Secured on the shaft 65 is a plurality of arms 66 (Figs. 1A, 6, 8 and 9), supporting a rod 70, which cooperates with extensions 71 on a series of tension arms 72 loosely mounted on the shaft 65. The arms 72 are arranged along the shaft 65 in pairs connected by studs 73 upon which are pivoted arms 74 connected by studs 75, having rotatably mounted thereon pressure rollers 76. Each pressure roller assembly has a shield 77 carried by the studs 73, which facilitates the insertion of paper around the platen 44 and assists in retaining the pressure roller assembly intact. Therefore it will be observed that each pair of arms 72 carries a pressure roller assembly consisting of a shield 77 and two pressure rollers 76 supported by the arms 74 upon the stud 73. As previously explained, the pressure roller assemblies pivot on the studs 73, thereby allowing the rollers of each assembly to adjust themselves so that they properly engage the platen 44. This pivoting movement is limited by tenons on the stud 75 cooperating with enlarged holes 78 in the arms 72.

Encircling the shaft 65 is a series of torsion springs 79 (Fig. 1A) which in cooperation with the arms 72 and adjusting collars 80, secured on the shaft 65 by set screws 81, urge the pressure rollers 76 into contact with the platen roll 44. The collars 80 permit the proper degree of tension to be applied to the torsion springs 79.

Directing attention to Figs. 6 and 7, the arm 57 has a roller 82 adapted to cooperate with a camming surface 83 on a lever 84 carrying a trunnion 85 journaled in a bushing (not shown) carried by the plate 32. The lever 84 has on its lower edge a projecting surface 86 arranged to cooperate with a stud 87 carried by a locking arm 88 loosely mounted on the shaft 56. The rearward end of the arm 88 has a radial surface 89 concentric with the shaft 37 and terminating in a notch 90. The radial surface 89 and notch 90 are adapted to cooperate with a roller 91 rotatably mounted on a bracket 92 secured to the traveling carriage frame 30. The bracket 92 has an extension 93 in the path of the stud 41, to stop the platen carrying frame at the terminus of its movement away from printing position.

The platen carrying frame is rocked away from printing position by the arms 49 and 50, which are rocked clockwise as viewed in Figs. 3 and 6 by mechanism to be described later. As the arms 49 and 50 are rocked, their bifurcated ends cooperating with the studs 52 and 53 in the arms 54 and 55 tend to rock the shaft 56 and the arms 57 and 58 clockwise from the position shown in Fig. 6 to the position shown in Fig. 7, but such movement is very slight, as it is interrupted by contact of the radial surface 89 of the locking arm 88 with the roller 91, which contact is caused by the roller 82 engaging the arm 84 and by means of the stud 87 urging the arm 88 clockwise, as here viewed, into contact with said roller 91.

It is therefore evident that, as clockwise movement of the arm 88 is blocked, the platen carrying frame will be rocked clockwise on its pivot rod 37, from the position shown in Figs. 6 and 8 to that shown in Figs 7 and 9, until the notch 90 is in alinement with the roller 91, at which time the arms 57 and 58 are free to move relatively to the platen carrying frame. Consequently, continued movement of the levers 49 and 50 causes the roller 82, in cooperation with the cam surface 83, to rock the arm 84 counter-clockwise and the arm 88 clockwise to engage the notch 90 with the roller 91, to effectively lock the platen carrying frame in open-throat position as shown in Figs. 7 and 9.

When the shaft 56 rocks independently of the platen carrying frame to lock said platen carrying frame in open-throat position, the slot 59 (Figs. 1A and 8) in the arms 57 and 58 cooperating with the rollers 61 and 62 rock the shaft 65 counterclockwise causing the rod 70 to rock the arms 72 counter-clockwise to disengage the pressure rollers 76 from the platen roll 44.

A stud 94 (Figs. 1 and 6) in the arm 54 engages a slot 95 in a link 96 pivoted to an upward extension of a lever 97 fulcrumed on a stud 98 in a bracket 99 secured to the frame 30 for the traveling carriage. As the platen is rocked to front feeding position, the stud 94 in cooperation with the end of the slot 95 rocks the lever 97 clockwise as viewed in Fig. 6. After the audited ledger sheet has been removed from the open-throat and a new ledger sheet inserted therein, the platen may be returned to printing position by pushing downwardly on a fingerpiece 100 of the lever 97. This rocks the rollers 82 out of engagement with the surfaces 83 on the arms 84 to permit the latch 88 to be spring-returned counter-clockwise to disengage the notch 90 therein from the stud 91. Return movement of the shaft 56 also returns the pressure rollers 76 to effective position to press the ledger sheet against the platen roll to prevent displacement of said ledger sheet while the platen is returning to printing position. After the latch 88 has been moved to ineffective position continued pressure on the fingerpiece 100 starts the platen carrying frame on its return journey to printing position. This overbalances the platen carrying frame, thus causing the momentum thereof, coupled with gravity, to return said platen carrying frame to printing position, as shown in Figs. 6 and 8.

*Automatic throat opening mechanism*

The present invention provides means for automatically rocking the platen from its normal or printing position to front feeding or open-throat position during the operating cycle of the machine. Such means is operated from the machine driving mechanism and may be controlled by one or more of the machine control keys, by the overdraft key, or by a special motor bar, which causes the machine to operate for the purpose of opening the throat of the front-feed platen.

The mechanism of the machine is supported by main frames 105 and 106 (Figs. 2, 3 and 12) secured to the machine base 34, said frames being maintained in rigid relation to each other by means of a cross-frame 108 and various other cross-frames, bars and rod (not shown). Journaled in the frames 105 and 106 is a main drive shaft 109 having secured on the right-hand end thereof an arm 110 connected by a link 111 to the driven member 112 (Fig. 12) of a clutch device, said driven member adapted to engage a driving member 113 geared to a conventional type of continuously running electric motor 107 supported by a housing 114 secured to the machine base 107.

For a detailed description of the driving motor and clutch mechanism reference may be had to Patent No. 1,601,102, issued September 28, 1926, to F. W. Bernau.

The arm 110 (Fig. 2) carries a stud 115, which is engaged by a notch in the lower end of a link 116, the upper end of which is pivoted to an arm 117 yieldingly connected to an arm 118 secured on the right-hand end of a printer shaft 119 journaled in the frame 105 and the printer framework (not shown). Secured on the shaft 119 is an arm 120 carrying a stud 121 adapted to cooperate with a notch 122 in the lower end of a bar 123, the upper end of which is pivoted to a crank 124 secured on a shaft 125, opposite ends of which are journaled in the frames 105 and 108 (Fig. 3). Also secured on the shaft 125 is a finger 127 which cooperates with the rod 51 to move the platen to front feeding position, as will be described later.

Adding, subtracting, total and sub-total operations are one-cycle operations and consist of one complete oscillation of the arm 110 and shaft 109 through an approximate angle of 60 degrees. One-cycle operations are initiated by the depression of a motor bar 128 (Fig. 2) which causes an extension thereof, which fits in a slot in the keyboard plate, to rock a plate 129 counter-clockwise on its pivot 130 against the action of a spring 141. A stud 131 in the plate 129 is embraced by an upward extension of a multi-armed lever 132 pivoted on a stud 133 in the frame 105, whereby counter-clockwise movement of said plate rocks said lever 132 clockwise. Clockwise movement of the lever 132 disengages a stud 134 in an extension thereof from a shoulder on a bell crank 135 pivoted on a stud 136 in the frame 105. The bell crank 135 is pivotally connected to the forward end of a pitman 137, the rearward end of which is bifurcated to straddle a stud 138 in the frame 105, and said pitman carries a stud 139 embraced by the slotted upper end of a clutch control lever 140. This disengaging of the stud 134 from the bell crank 135 releases said bell crank and connected parts to the action of a spring (not shown) which immediately rocks the lever 140 counter-clockwise to engage the clutch driven member with the clutch driving member. It requires one revolution of the clutch driven member to oscillate the arm 110 (Fig. 2) through one-cycle of movement and after this movement has been completed a roller (not shown) on the clutch driven member restores the arm 140 and the bell crank 135, whereupon the spring 141, one end of which is connected to the plate 129, returns the stud 134 into the path of the shoulder on the bell crank 135 to obstruct releasing movement thereof. In case the starting bar 128 is accidentally or inadvertently retained depressed, at the end of machine operation, the usual non-repeat device prevents repeat operations of the machine. As previously explained, the notch in the link 116 (Fig.

2) is normally engaged with the stud 115 in the arm 110 and consequently the printer shaft 119 is rocked in unison with said arm 110 first clockwise and then back to normal position.

Normally a latch 142 (Figs. 2 and 16) pivoted on a stud 143 in the frame 105, in cooperation with a stud 144 in the bar 123, holds said bar against the action of a spring 145, tensioned between said bar 123 and the arm 120, when the stud 121 moves opposite the notch 122, to prevent said notch from engaging said stud. However, various means, now to be described, are provided for rocking the latch 142 out of engagement with the stud 144 to permit the notch 122 to engage the stud 121 whereupon return movement of the shaft 119 and the arm 120 rocks the shaft 125 and the finger 127 counter-clockwise from the positions shown in Figs. 6 and 16 to the position shown in Fig. 7, which by means of the rod 51 (see also Fig. 3), in cooperation with the arms 49 and 50, rocks the platen carrying frame clockwise to open the throat of the front-feed carriage in the manner explained above. After the throat has been opened, an extension 146 of the link 123 engages an obstruction which prevents further movement of said link in unison with the arm 120, whereupon the stud 121 rides out of the notch 122 thereby permitting the spring 145 to return the link 123, the shaft 125 and finger 127 to normal positions, as shown in Fig. 16.

*Control of throat opening by total keys*

One means of controlling the latch 142 for the throat-opening mechanism (Figs. 3, 4 and 16) is by means of a series of total control keys 147 located on the left-hand side of the keyboard. The total control keys 147 select and condition their respective totalizers for total operations, and when used in conjunction with a sub-total key 148 select and condition their respective totalizers for sub-total operations. The keys 147 and 148 are mounted to slide vertically in the framework of the keyboard and are retained in upward or undepressed position by means of compression springs (not shown) which position is determined by shoulders on the upper ends of the stems of said keys in cooperation with the keyboard top plate (not shown). The lower ends of the stems of the keys 147 cooperate with angular camming lugs 149 on a control bar 150 mounted for horizontal sliding movement by means of slots therein in cooperation with studs 151 secured in the frame 106. A link 157 (Figs. 2, 3 and 4) connects the bar 150 to a crank 158 secured on one end of a shaft 159 journaled in the frames 105 and 106. Secured on the other end of the shaft 159 is a curved arm 160 connected by a link 161 to an arm 162 (Fig. 16) fulcrumed on a stationary stud 163 and connected by a link 164 (Fig. 2) to a symbol type sector 165 rockably mounted on an impression arm 166.

Depressing one of the total keys 147 shifts the bar 150 forwardly to rock the shaft 159 clockwise to position the printing sector 165 in proportion to said depressed total key, to cause an identifying symbol to be printed opposite the total. After the symbol sector has thus been positioned it is locked against displacement, during machine operation, by a stud 168 (Figs. 2 and 16), in the arm 162, in cooperation with a deep notch 167 or one of several shallow notches 169, corresponding to the different total keys, in an alining lever 170 free on a stationary stud 171. Upon operation of the machine, initial movement clockwise of the printer shaft 119 and an arm 172, integral therewith, withdraws a stud 173 in said arm from an extension of the alining lever 170, permitting a spring 174 to rock said lever clockwise to engage the corresponding notch 167 or 169 with the stud 168 to lock the symbol sector 165 in set position.

If the arm 162 is positioned so that the stud 168 is opposite the deep notch 167 the lever 170 will move sufficiently to cause a stud 175 in an extension thereof to engage a lever 176 fast on a short shaft 177 journaled in the frame 105 and rock said lever counter-clockwise. Counter-clockwise movement of the lever 176 causes a stud 178, in a rearward extension thereof, in cooperation with a U-shaped slot in an extension of the latch 142, to rock said latch clockwise out of engagement with the stud 144, whereupon the spring 145 moves the notch 122 in the bar 123 into the path of the stud 121. Return movement counter-clockwise of the printer shaft 119 and the arm 120 causes the stud 121 to engage the notch 122 to rock the shaft 125 and the finger 127 counter-clockwise to open the throat of the carriage in the manner explained above.

Return movement counter-clockwise of the shaft 119 and the arm 172 causes the stud 173 to move the aliner 170 counter-clockwise to ineffective position to move the stud 175 out of engagement with the lever 176. At about the same time, the stud 121 rides out of the notch 122, releasing the bar 123 to the action of the spring 145, which immediately returns said bar and connected parts, including the finger 127, to normal position, as shown in Fig. 16, whereupon the latch 142 is returned by gravity into engagement with the stud 144. There is a notch in the aliner 170 for each of the total keys 147 (Fig. 3) and obviously any or all of these notches may be cut deep to render the automatic throat-opening mechanism effective. However, as presently arranged the notch 167 for the No. 1 or balance key is cut deep, and consequently renders the automatic throat-opening mechanism effective.

*Overdraft key control of throat-opening*

The machine embodying the present invention is equipped with an automatic overdraft mechanism that transposes the complementary amount of an overdraft into a true negative amount and prints either a total or a sub-total of this true negative amount upon the record material. In a sub-overdraft operation the complementary amount of the overdraft is reentered in the balance totalizer in preparation for further computations in connection therewith.

Overdraft operations are initiated by the depression of an overdraft key 179 (Figs. 2 and 17) which also conditions the machine for said overdraft operations. In the present machine an overdraft operation consists of four cycles of operation of the machine, and the cycling of the machine and all the functions thereof are controlled by an overdraft cam assembly which makes one revolution during the four cycles of an overdraft operation. In the first cycle of an overdraft operation the complementary amount of the overdraft is cleared from the balance totalizer and entered in a storage device. In the second cycle the complement is subtracted from the cleared balance totalizer thereby leaving the true negative amount in said balance totalizer. During the third cycle of an overdraft operation the balance totalizer is again cleared and the true negative amount of the overdraft is entered in the previously cleared storage device and in the fourth cycle the storage device is again cleared and the true negative amount of the overdraft is printed upon the record material. In sub-overdraft operations the complement is reentered in the balance totalizer during the fourth cycle.

In order to prevent undesirable and erroneous entries from being made upon the record material during the transposing cycles of an overdraft operation, the printing mechanism is rendered inoperative during the first three cycles of said overdraft operation and is rendered effective during the last cycle to print the true negative balance. During the printing cycle of an overdraft operation the slide 150 (Fig. 3) is shifted forwardly in a manner presently to be described, to position the symbol printing sector 165 (Fig. 2) to print a symbol characteristic of said overdraft operation upon the record material. As there is an alining notch in the aliner 170 (Fig. 16) corresponding to the position of the symbol sector in overdraft operations, it is possible to control the opening of the throat in overdraft operations in exactly the same manner as explained for the total keys 147 (Fig. 3).

The portion of the overdraft mechanism essential to a proper disclosure of the present invention will now be described in detail.

Depressing the overdraft key 179 (Fig. 2) rocks a latch 186 out of engagement with a bent-over ear on a lever 180 pivoted on the stud 136, releasing said lever to the action of a strong spring, which immediately rocks said lever clockwise. The lever 180 is connected by a link 181 to the plate 129. Consequently clockwise movement of said lever carries the plate 129 counter-clockwise in unison therewith to disengage the stud 134 from the shoulder of the arm 135 to set the machine in motion in the manner explained previously. Clockwise movement of the lever 180 also withdraws a surface 182 thereof from a stud 183 in a hook 184, whereupon a spring 185 engages said hook with the stud 134 to prevent said stud from engaging the shoulder of the arm 135 when said arm is restored at the end of each cycle of operation, thereby causing the machine to cycle automatically. In the last cycle of an overdraft operation the lever 180 is restored counter-clockwise into engagement with the latch 186, which movement moves the hook 184 out of engagement with the stud 134 to permit said stud to engage the shoulder of the arm 135 to terminate cycling of the machine.

Depressing the overdraft key 179 (Figs. 17 and 18) causes a stud 187 therein, in cooperation with a slot in a pitman 188, pivoted to a crank 189 secured to the main shaft 109, to engage a notch 190 in said pitman with a stud 191 in a slide 192 mounted for horizontal reciprocation by means of slots therein in cooperation with the shaft 109 and the stud 133. It is therefore apparent that the slide 192 is reciprocated, by the lever 110, first to the left, as here viewed, and then back to normal position. The slide 192 carries pawls 193 and 194 urged by a spring 195 into engagement with the teeth of their respective ratchets 196 and 197, said ratchets being an integral part of the overdraft cam assembly which is rotatably mounted upon the stud 133. The push-pull action of the pawls 193 and 194, in cooperation with their respective ratchets, drives the overdraft cam assembly one-fourth of a revolution for each cycle of an overdraft operation. Consequently during the four cycles of an overdraft operation the overdraft cam assembly is driven one complete revolution, during which it controls the action of the machine to properly effect an overdraft operation. A spring-pulled retaining pawl 198 (Fig. 18) in cooperation with the teeth of the ratchet 196 prevents retrograde movement of the overdraft cam assembly. For a more complete disclosure of the above mechanism reference may be had to U. S. Patent No. 2,079,355 issued May 4, 1937, to Chas. L. Lee.

Clockwise movement of the lever 180 (Fig. 2) when the overdraft key 179 is depressed, by means of a link 199, which connects said lever to the printer operating link 116, shifts said link 116 out of engagement with the stud 115 in the arm 110 and shifts a notch 205 therein into engagement with a stationary stud 206. This disengages the drive of the printer shaft 119 from the arm 110, and consequently all the mechanism operated by said printer shaft, including the automatic throat-opening mechanism, remains inoperative at this time. During the third cycle of an overdraft operation the lever 180 is returned counter-clockwise, as explained hereinbefore and is reengaged by the latch 186, which movement of said lever 180 reengages the link 116 with the stud 115, so that the printer mechanism will function during the final or fourth cycle of an overdraft operation to print the true negative amount of said overdraft.

Sub-overdraft operations are initiated by a sub-overdraft key 204 (Figs. 2, 3 and 17) depression of which causes the machine to function in exactly the same manner as explained in connection with the overdraft key 179, the only difference being that during the final cycle of a sub-overdraft operation the complementary amount of the overdraft is reentered in the balance totalizer so that further computations may be carried on in connection with this particular balance.

Integral with the ratchets 196 and 197 (Figs. 5 and 18), and moving in unison therewith, is a cam 207 which controls the engagement of a storage device with the amount actuators during overdraft operations. The periphery of the cam 207 cooperates with a roller 208 on an arm 209 secured on a shaft 210 (Figs. 3, 4 and 5) journaled in the frames 105 and 106. Also secured on the shaft 210 is a cam arm 211 having a camming surface 212 which cooperates with a stud 213 in the control bar 150. Similar high portions 214 and 215 of the cam 207 rock the shaft 210 and the arm 211 counter-clockwise against the action of a spring 216 during an overdraft or a sub-overdraft operation. Counter-clockwise movement of the arm 211 causes the camming surface 212 to shift the bar 150 forwardly to position the symbol sector 165 (Fig. 2) to print a symbol characteristic of an overdraft or a sub-overdraft operation. Inasmuch as the high surface 214 of the cam 207 positions the bar 150 and the symbol sector 165 during the first and second cycles of an overdraft operation, at which time the printer mechanism is disabled, this positioning is of no effect. However, the surface 215 positions the bar 150 and the sector 165 during the third and fourth cycles of an overdraft operation which positioning moves the stud 168 in the arm 162 (Fig. 2) opposite a notch 217 (Fig. 16) in the aliner 170.

Initial movement clockwise of the shaft 119 and the arm 172 permits the aliner 170 to move clockwise to engage the notch 217 with the stud 168, under influence of the spring 174. As the notch 217 is a deep notch, it permits the stud 175, in the aliner 170, to rock the lever 176 counter-clockwise to move the latch 142 out of engagement with the stud 144 to permit the spring 145 to move the notch 122, in the link 123, into engagement with the stud 121, whereupon return movement counter-clockwise of the shaft 119 and the arm 120 rocks the shaft 125 and the finger 127 counter-clockwise to open the throat of the front-feed carriage in the manner explained earlier herein.

It is to be understood that the arm 162 and the sector 165 are moved to the same position in both overdraft and sub-overdraft operations. Obviously, if it is undesirable that the overdraft and sub-overdraft keys cause the throat to open automatically the nut 217 may be cut shallow as are the notches 169.

Manipulative means is provided for rendering the automatic throat-opening mechanism inoperative. This means includes a plate 218 (Figs. 2 and 16) slidably mounted on the lever 170 by means of slots therein in cooperation with studs 219 in said arm 170. The plate 218 has notches 203 therein corresponding to the notches 167, 169 and 217, and said notches 203 are retained in alinement with the notches in the lever 170 by a spring 220, tensioned between the lever 170 and the plate 218 to urge said plate upwardly. The plate 218 carries a stud 221 which cooperates with an arcuate surface 222 on the bottom of a lever 223 pivoted at 224 to a bracket mounted on the machine case 31.

Depressing the lever 223, by means of a convenient fingerpiece 225 thereon, shifts the plate 218 downwardly to move the projection formed by the adjacent notches 203 therein into register with the notches 167, 169 and 217 to render all of said notches shallow so that the aliner 170 will not receive maximum movement in any position and consequently the latch 142 will not be rendered ineffective. When the lever 223 is depressed, the flat surface of a stud 226 carried by said lever is moved beyond the shoulder of a latch 227 pivoted on a bracket on the case 31, whereupon a spring 228, tensioned between said latch 227 and the lever 223, immediately urges said latch counter-clockwise to cause the shoulder thereon to move over the stud 226 to lock the lever 223 in depressed position. A fingerpiece 229 on the upper end of the latch 227 provides means for disengaging the shoulder of said latch from the stud 226 and when said latch is thus disengaged the spring 228 returns the lever 223 upwardly to ineffective position as here shown.

*Machine locking mechanism*

Mechanism controlled by the traveling carriage is provided for locking the machine starting bar against depression when the traveling carriage is out of columnar position.

Secured on the front of the traveling carriage 30 (Fig. 1) is a tabulating stop bar 230, which adjustably supports a tabulating stop 231 for each columnar position which, in addition to stopping the traveling carriage in predetermined columnar positions, have lugs 232 thereon which in cooperation with the upturned ends of hanging bar levers 233 (only two here shown) select the different totalizers for addition and select the balance or No. 1 totalizer for subtraction. The stop 231 also has a lug 234 adapted to cooperate with the upturned end of a hanging bar lever 235 rotatably mounted on a fixed pivot secured in one of the cross frames of the machine. The left-hand end of the lever 235 (Fig. 14) is connected by a link 236 to a crank 237 fast on a shaft 238 journaled in the frames 105 and 106. Also secured on the shaft 238 is an arm 239, the upper end of which engages a stud 240 in an extension of a lock plate 241, fulcrumed on a stud 242 in the frame 105.

When the traveling carriage is out of columnar position a spring 242, stretched between the plate 241 and a lock lever 243, also free on the shaft 242, urges said plate 241 counter-clockwise to maintain a locking shoulder 244 thereon in the path of a square stud 245 in the plate 129 to obstruct counter-clockwise releasing movement of said plate when the starting bar 128 is depressed. Moving the traveling carriage to any columnar position (Fig. 1) causes the lug 234 to engage the lever 235 to rock said lever clockwise, which movement by means of the link 236 (Fig. 14) rocks the crank 237, the shaft 238, and arm 239 counter-clockwise, and the locking plate 241 clockwise to move the shoulder 244 out of the path of the stud 245, to free the plate 129 for releasing movement.

Other means, presently to be described, is provided for controlling the locking plate 241.

*Mechanism to lock the machine against operation when the journal sheet is exhausted*

Mechanism is provided for locking the machine starting bar against depression when the lower end of the journal sheet passes a certain point. This notifies the operator that the journal sheet is about exhausted, so that a new one may be substituted therefor.

A journal sheet 246 (Figs. 1, 8 and 15), long enough to receive all the entries for a certain business period, is threaded around the platen roll 44 by means of the guide plate 36 and is retained in contact with said platen roll by auxiliary pressure rollers 247, which are independent of the pressure rollers 76 for the ledger sheets, and remain effective when the throat of the front-feed carriage is open to hold the journal sheet against displacement at this time. The ledger sheet 246 cooperates with two feelers 248, only one here shown, fast on a shaft 249 journaled in the platen frame end plates 32 and 33 (Figs. 6 and 8).

Also secured on the shaft 249 are two arms 255 (Fig. 14), only one here shown, slotted to embrace studs 256 in similar arms 257 and 258 (Figs. 3 and 14) pivoted respectively on the plates 32 and 33. The arms 257 and 258 support a rod 259 which extends the full length of the traveling carriage and which is arranged to cooperate with a bent-over portion 260 of an arm 261 secured on one end of a sleeve 262, free on the shaft 125. Secured on the other end of the sleeve 262 is a hook-shaped arm 263, having a slot which cooperates with a stud 264 in one arm of a three-armed lever 265, free on the stud 143 and having a stud in one arm thereof which is embraced by the slotted end of a lever 266 fulcrumed on a stud 267 in the frame 105. When the journal sheet is in contact with the feelers 248 said feelers are retained in full-line position as shown in Fig. 15, and by means of the arms 252 position the arms 257 and 258, as shown in Fig. 14, to cause the rod 259 to position its associated parts, as here shown, so that a forward extension of the lever 266, in cooperation with a stud 268 in an extension of the lock lever 243, retains a shoulder 269 of said lever out of the path of the stud 245 to permit depression of the starting bar 128.

When the lower end of the journal sheet 246 (Figs. 14 and 15) moves beyond the feelers 248, said feelers move counter-clockwise, under the influence of a spring 270, into corresponding openings in the table 36 to the dot-and-dash position shown in Fig. 15. The arms 257 and 258 move in unison with the feelers 248 to withdraw the rod 259 from the bent-over portion of the arm 261 to free said arm and associated parts to the action of a spring 271, one end of which is connected to an extension of the lever 265. The spring 271 rocks the lever 266 counter-clockwise to permit the spring 242 to rock the shoulder 269 into the path of the stud 245, to block releasing movement of the plate 129. When a new journal sheet is inserted in the machine the feelers 248 are restored to their full-line position and in cooperation with the train of mechanism shown in Figs. 14 and 15, return the lock lever 243 to ineffective position as here shown.

Sometimes it is desirable to continue operating the machine after the end of the journal sheet passes beyond the feelers 248, and to this end manipulative means has been provided for returning the lever 243 to ineffective position.

Normally a lever 272 pivoted at 273 to the plate 32 is in the position shown in full-lines in Fig. 14, where a notch 274 therein is opposite a stud 275 in an extension of the lever 257, and consequently said lever 272 does not interfere with clockwise movement of said arm 257, when the end of the journal sheet 246 passes beyond the feelers 248 (Fig. 15). If it is desirable to continue operating the machine after the end of the journal sheet has passed beyond the feelers 248, moving the lever 272 clockwise causes a camming surface 276 thereon, in cooperation with the stud 275, to return the arms 257 and 258 and the rod 259 counter-clockwise to the position here shown. This return movement of the rod 259 through the train of mechanism shown in Fig. 14 restores the lever 243 to ineffective position.

It will be recalled, that at the time the throat of the front-feed carriage is opened the shaft 56 (Figs. 6, 7 and 14) is rocked clockwise as here shown, which by means of a stud 277 in a crank 278 secured to said shaft, in cooperation with a camming surface 279 on the lever 272, returns said lever to ineffective position, when the notch 274 is opposite the stud 275, thereby causing the lever 243 to again become effective when the throat of the carriage is closed to remind the operator that the end of the journal sheet is approaching the printing line. A spring 280 normally retains the lever 272 in ineffective position.

The mechanism described above also operates to lock the machine against operation when the throat of the front feed carriage is open. Rocking the platen carrying frame to front feed position withdraws the rod 259 from the bent-over portion of the arm 261 to cause the locking lever 243 to be moved clockwise to locking position, in the manner explained above.

Obviously, the above locking mechanism is effective only when a journal sheet, in cooperation with the feelers 248, retains the rod 259 in the position shown in Fig. 14, and it is likewise evident that closing the throat of the front feed platen rocks the locking lever 243 to ineffective position.

*Tabulating and vertical feeding mechanisms*

During normal operations the traveling carriage is automatically tabulated from one column to the next, near the end of each operation. However, there are times when it is desirable to prevent tabulation of the traveling carriage and to simultaneously cause the platen roll to be rotated to line-space the ledger and the journal sheets. To this end a vertical feed starting bar 281 (Fig. 2) is provided, which when depressed, causes the machine to operate in the normal manner, with these exceptions: Automatic tabulating mechanism is rendered ineffective and the platen roll feeding mechanism is simultaneously rendered effective.

Figure 1:
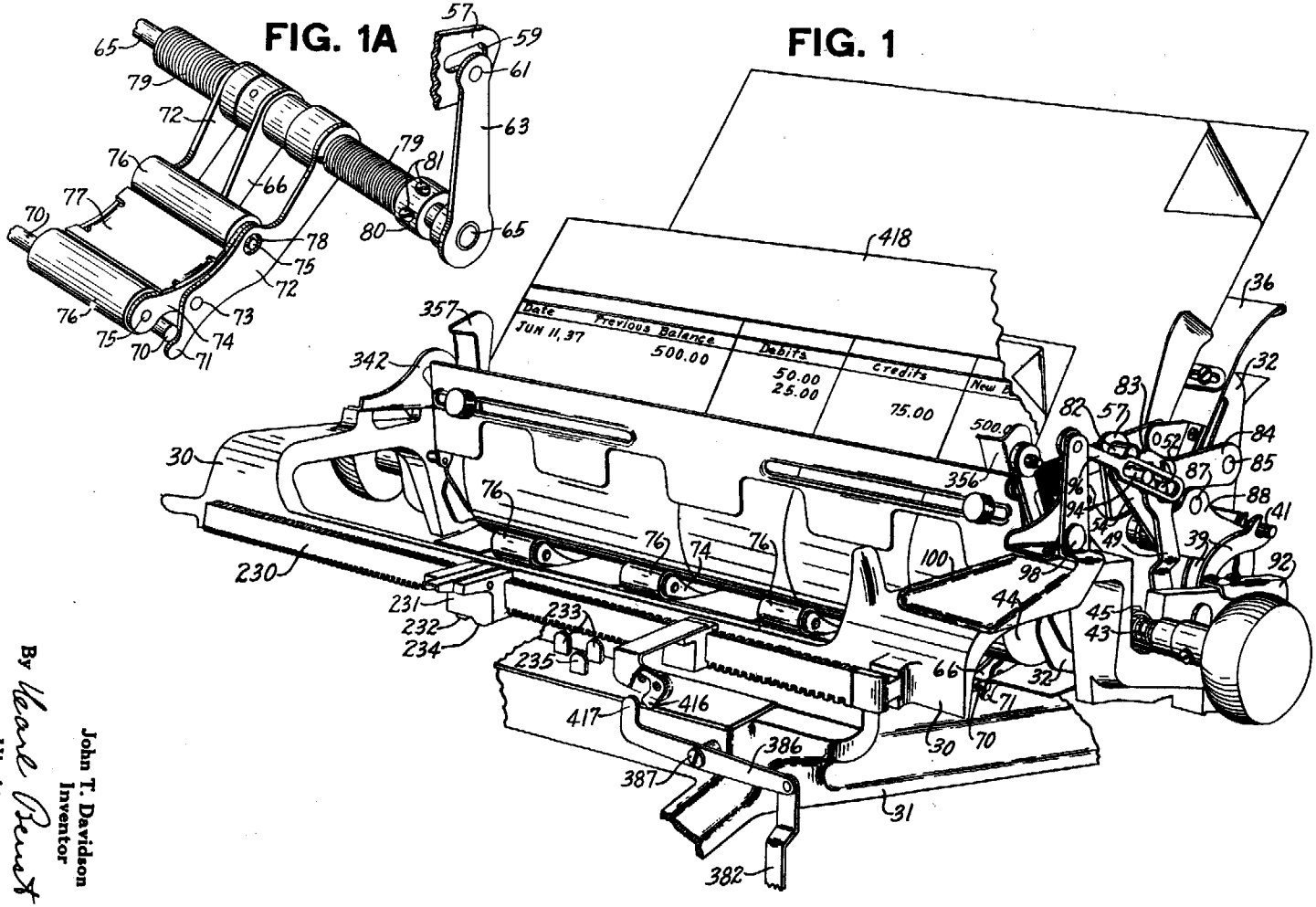
Fig. 1 is a perspective view of the front feed traveling carriage of the machine of the present invention.
Figure 2:
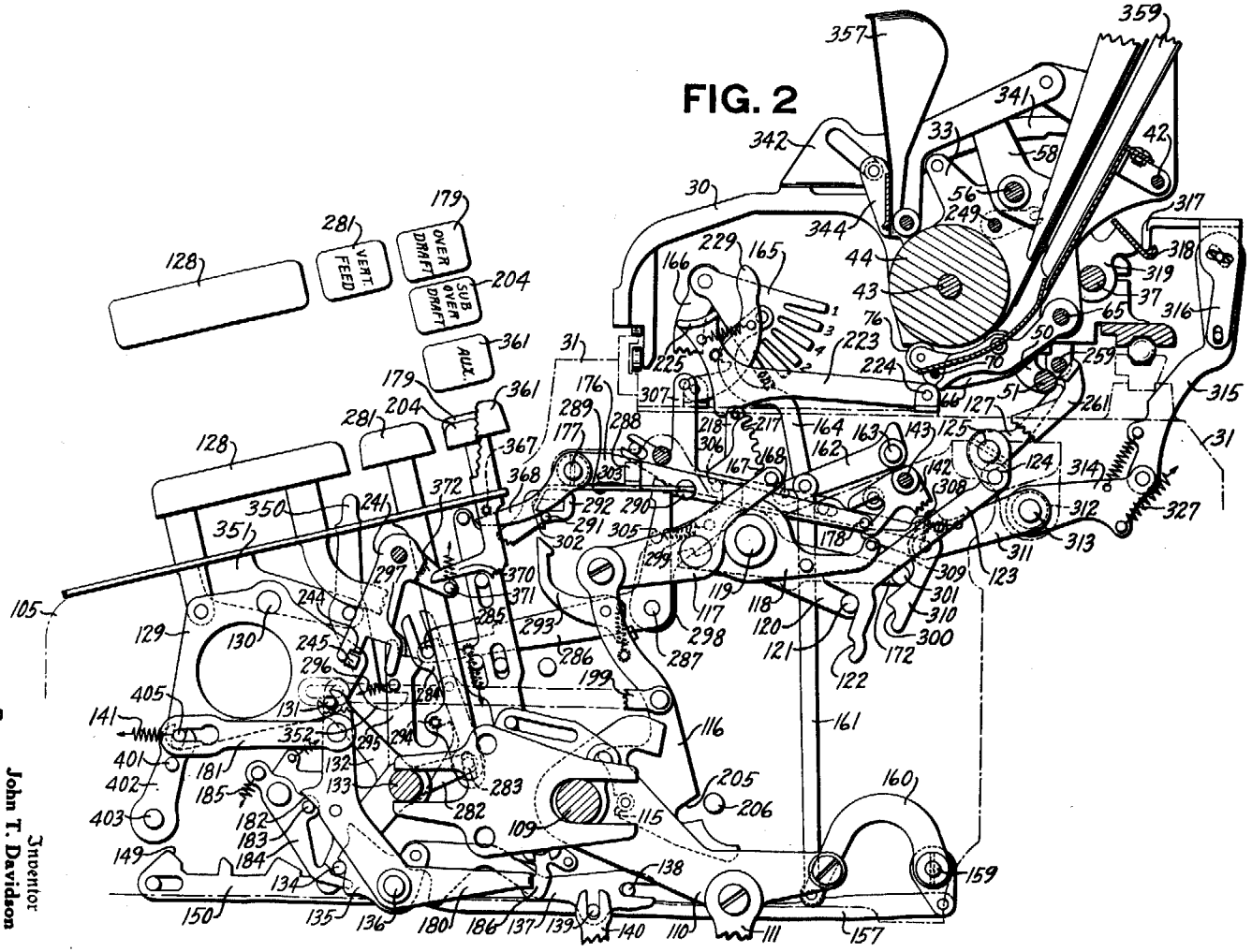
Fig. 2 is an elevation, as observed from the right of the machine, illustrating the mechanism that controls the opening of the throat of the front feed carriage.

Directing attention to Fig. 2, an extension 282 of the lever 132 carries a stud 283 upon which is pivoted a link 284, the upper end of which is bifurcated to receive a stud 285 in the forward end of a lever 286 free on a stationary stud 287. As previously explained, depressing the starting bar 128 rocks the lever 132 clockwise to initiate operation of the machine, which movement of said lever by means of the link 284 permits the lever 286 to be spring-urged counter-clockwise to cause an upward extension thereof to engage a projection 288 of a tabulating control bar 289, mounted in a slotted stud 290 secured in the printer framework, and rock said bar outwardly, as here viewed, against the action of a spring 303. This rocking of the bar 289 moves a foot-shaped extension 302 thereof away from a stud 291 in a tabulating bar 292, thereby permitting a spring-pulled tabulating hook 293, pivoted on the link 116, to latch over said stud 291 upon upward movement of said link 116. Downward movement of the link 116 causes the hook 293 in cooperation with the stud 291 to carry the tabulating bar 292 downwardly in unison therewith to cause the traveling carriage to automatically tabulate from one columnar position to the next, near the end of machine operation.

Before the link 116 completes its downward movement the hook 293 rides off the stud 291, permitting the bar 292 to be spring returned upwardly to the position here shown, whereupon restoration of the lever 132, counter-clockwise, near the end of machine operation, restores the lever 286 counter-clockwise to permit the bar 289 to be returned by the spring 303, to the position here shown where the foot-shaped extension 302 thereof will protect the stud 291 from the hook 293.

The stud 283 in the extension 282 also extends through a slot in the stem of the vertical starting bar 281, and consequently depression of said starting bar rocks the lever 282 clockwise, the same as depressing the bar 128, to set the machine in motion. Also, depressing the bar 281 causes a stud 294 in the stem thereof, in cooperation with an extension of a lever 295 free on the stud 133, to rock said lever clockwise against the action of a spring 296 to move an arcuate surface 297, on said lever, beneath the stud 285 to obstruct counter-clockwise movement of the lever 286. This permits the bar 289 to remain effective, as shown in Fig. 2, so that the extension 302, thereof will protect the stud 291 from the hook 293; therefore, during up and down movement of the link 116 the hook 293 rides idly on the sole of the foot-shaped extension 302 and as no tabulating movement is imparted to the bar 292 the traveling carriage remains stationary.

The vertical feed starting bar 281 also renders the mechanism effective that line-spaces the platen. An arm 298 free on the stud 287 is yieldingly connected to the lever 286 by a spring 299, which urges a shoulder on said arm 298 into contact with a stud 305 in said lever 286. It is therefore obvious that upon depression of the motor bar 128 the lever 286 and the arm 298 move counter-clockwise in unison, causing an upward extension of said arm 298 in cooperation with a stud 306 on a bar 307, slidably mounted in the framework of the machine, to shift said bar forwardly. Forward movement of the bar 307, by means of a right angled extension 308 on the rearward end thereof in cooperation with a stud 309 in a pawl 310, rocks said pawl counter-clockwise. The pawl 310 is pivoted on an arm 311 fast on a sleeve 312 free on a shaft 313, journaled in the machine framework, and said pawl is spring-urged clockwise to normally maintain the stud 309 in contact with a shoulder on the arm 311.

Counter-clockwise movement of the pawl 310, under influence of the bar 307, moves a notch 300 in said pawl out of the path of a stud 301 in the arm 172. Consequently the oscillating movement of said arm 172, during machine operations, imparts no movement to the sleeve 312, whereupon the platen line-spacing mechanism is rendered inoperative, as this sleeve controls the operation thereof.

Secured on the sleeve 312 (Fig. 2) is an arm 314 having pivoted thereto an arm 315 upon which is adjustably mounted a platen feed hook 316, a downwardly extending portion 317 of which is adapted to cooperate with the curled-over lower edge of a bail 318 secured to a plurality of arms 319 free on the shaft 37. An extension of the extreme left-hand arm 319 (Fig. 11) carries a stud 320, which cooperates with a curved slot in a link 321, connected to an arm 322, loose on the platen shaft 43. Mounted on the arm 322 is a feed pawl 323 urged counter-clockwise by a spring 324, so that the tooth of said pawl normally engages the teeth of a ratchet wheel 325 integral with the platen roll 44.

As previously explained, depressing the vertical feed starting bar 281 (Fig. 2) causes the arm 295 to obstruct counter-clockwise movement of the lever 286 and the arm 298, and as a result the bar 307 will not be moved forwardly to rock the pawl 310 out of the path of the stud 301. Initial movement counter-clockwise of the printer shaft 119 and the arm 172, during machine operation, causes the stud 301 to by-pass the end of the pawl 310, and return movement of said shaft and said arm 172 causes the stud 301 to engage the notch 300 to rock the arms 311 and 314 clockwise, as viewed in Fig. 2, to shift the arm 315 and the hook 316 downwardly. Downward movement of the arm 315 and the hook 316 causes the bent-over extension 317 in cooperation with the curled edge of the bail 318, to rock said bail and the arm 319 clockwise, as viewed in Fig. 2, and counter-clockwise, as viewed in Fig. 11. Counter-clockwise movement of the extreme left-hand arm 319 (Fig. 11) causes the stud 320 in cooperation with the link 321 to rock the arm 322 counter-clockwise, contrary to the action of a spring 326, whereupon the pawl 323 engages the ratchet 325 to rotate the platen roll 44 counter-clockwise in unison with said arm 322 to line-space the ledger card and the journal sheet.

When the arm 172 (Fig. 2) nears the end of its return movement counter-clockwise the stud 301 rides out of the notch 300, thereby permitting a spring 327 to return the arms 311, 314 and 315 counter-clockwise to normal positions, as here shown. A spring 328 (Fig. 11) returns the bail 318 and the arm 319 in unison with the arm 315 and the hook 316, and the spring 326 simultaneously returns the arm 322 and the pawl 323 to normal positions, as here shown.

The platen roll 44 is retained in position by means of the teeth of the ratchet 325 (Fig. 10) in cooperation with a roller 329 mounted on an arm 330, free on a stationary stud 331, and urged counter-clockwise by a spring 332 to yieldingly engage said roller 329 with the teeth of the ratchet 325.

Each tooth of the ratchet 325 (Figs. 10 and 11) represents one line-space on the platen roll 44 and full movement of the arm 322 causes the pawl 323 to advance the ratchet and the platen roll three tooth spaces to triple-space the record material. In order to control the number of line-spaces that the platen 44 is rotated, means is provided for controlling the moment of engagement of the pawl 323 with the teeth of the ratchet 325. This controlling means is manually adjustable to three positions, single, double, and triple line spacing positions.

Free on the shaft 43, (Figs. 10 and 11) is a manipulative lever 333, having an arcuate surface 334 which cooperates with a stud 335 in the pawl 323. The lever 333 is adjustable to three positions and these positions are determined by three notches in the periphery thereof, in cooperation with the tooth 336 of a retaining pawl 337 fulcrumed on a stationary stud 338. The spring 332, which is tensioned between the arm 330 and the pawl 337, yieldingly urges the tooth 336 into engagement with the notches in the lever 333.

With the lever 333 in any of its three positions, return movement of the arm 322 causes the stud 335 to ride up an inclined surface onto the arcuate surface 334 to disengage said pawl from the teeth of the ratchet 325, so that the platen roll 44 may be revolved in either direction by hand. When the lever 333 is in its first position, as shown in Fig. 10, the pawl 323 is allowed to engage the ratchet 325 at the earliest moment, upon feeding movement of the arm 322, and consequently picks up three teeth of said ratchet teeth to triple line-space the platen 44. Moving the lever 333 to its second position delays the moment of engagement of the pawl 323 with the ratchet 325 and consequently said pawl picks up only two teeth of the ratchet 325 to double line-space the platen roll. Moving the lever 333 counter-clockwise to its third position further delays the moment of engagement of the pawl 323 with the ratchet 325 thereby causing the platen roll to be single line-spaced.

The slot in the link 321 (Fig. 11) moves out of operative relationship with the stud 320, when the platen is moved to front feeding position, and as a result the mechanism just described is rendered ineffective to rotate the platen 44. To remedy this condition, mechanism which functions automatically when the platen is moved to front feeding position has been provided to rotate the platen roll 44 to line-space the record material wound therearound.

When the platen 44 is moved upwardly to front feeding position a roller 339 (Fig. 11) on the arm 322, engages an arcuate surface 340 on an arm 341 of a bracket 342, secured on the frame of the carriage 30 (see also Figs. 8 and 9), and the contour of the surface 340 rocks the arm 322 counter-clockwise to rotate the platen 44 to line-space the record material wound therearound. The curved slot in the link 321 permits said link and the arm 322 to move independently of the arm 319 when the platen is rocked to front feeding position.

A fourth position of the lever 333 (Fig. 10) moves the surface 334 thereon in relation to the stud 335 so that during oscillation of the arm 322 (Fig. 11) said stud 335 will not ride off of said surface 334 and as a result the pawl 323 is retained out of engagement with the teeth of the ratchet 325 to disable the automatic line-spacing of the platen 44.

A manipulative friction lever 350 (Fig. 2), pivoted on a bracket 351 fast to the keyboard plate, is provided for holding the lever 286 in its upward position (as here shown), to render the automatic tabulating mechanism ineffective and the line-spacing mechanism effective regardless of which starting bar is used to initiate machine operation.

The lever terminates in a fingerpiece which protrudes through an opening in the keyboard plate. As here shown, a hook-shaped projection 352 of the lever 350 is out of the path of the stud 285 and consequently said lever has no control over the lever 286.

Moving the lever 350 counter-clockwise to effective position causes the projection 352 to engage the stud 285 to retain the lever 286 against downward or counter-clockwise movement.

*Front feed guide chute*

A guide chute has been provided for guiding the ledger sheets around the platen when inserted in the open throat of the front feed platen. This mechanism also serves as a line finding device for properly locating the ledger sheet or other material inserted in the throat, in relation to the printing line. When the platen and its rockable frame are in printing position the guiding mechanism is retained in a position where it will not obstruct the view of the printing line. The rocking of the platen away from printing position to open throat position moves the guiding mechanism to a position where it will properly direct material around the platen roll and to where the line finding device is effective to locate the record material in relation to the printing line.

Referring to Figs. 6, 7, 8 and 9, pivoted on the platen shaft 43, just inside the platen end plates 32 and 33, are arms 343 and 344 carrying at their upper ends rollers 345 and 346 projecting into angular slots 347 and 348 formed in brackets 349 and 342, secured on the traveling carriage frame 30. The arms 343 and 344 are connected by a guiding bar 355, which is secured to right-angled surfaces formed on said arms 343 and 344. Adjustably attached to each end of the bar 355 are lateral guides 356 and 357, the lateral location of which may be changed in relation to the platen 44 to accommodate different widths of ledger sheets. The rocking of the platen away from printing position (Figs. 7 and 9) and the cooperation of the rollers 345 and 346 with the angular slots 347 and 348 change the position of the arms 343 and 344 so that the bar 355 and lateral guides 356 and 357 are tilted into alinement with a front feed guide table 358, which extends the width of the platen 44 and is secured to the platen frame end plates 32 and 33. Adjustably mounted on the table 358 are rear lateral guides 359 (Figs. 8 and 9) the lateral locations of which may be shifted to conform to the locations of the front guides 356 and 357.

When the platen 44 is in open-throat position as shown in Fig. 9, the top edge of the bar 355 is so positioned, in relation to the printing line, that it serves as a line finding device for locating the ledger sheet in relation to the printing line.

It will be recalled that when the platen is in front feeding position the pressure rollers 76 (Fig. 9) are disengaged therefrom, thereby permitting ledger sheets to be inserted within the lateral guides 356 and 357 and simply pushed around the platen 44, guided by the front feed table 358 until the proper edge of the bar 355 is in alinement with the bottom of the last row of printing upon said ledger sheet. This locates the ledger sheet in relation to the printing mechanism, so that when the throat of the front feed platen is closed, the space just below the printing on said ledger sheet will be in alinement with the type carriers.

The line-spacing of the platen or the printing of a large number of numerals at one time, have a tendency to rock the platen slightly out of printing position. To overcome this tendency a spring-pulled restraining pawl 360 (Figs. 8 and 11) pivoted on the bracket 342, is provided, which in cooperation with the roller 346 creates sufficient resistance to hold the platen 44 and its carrying frame in printing position under the above conditions.

*Auxiliary starting bar*

At times it is desirable to have the throat of the front feed carriage open without depressing any of the control keys or the overdraft or sub-overdraft keys, and to this end an auxiliary starting bar has been provided, depression of which renders the throat-opening mechanism effective and simultaneously sets the machine in motion, this latter being necessary to actuate the automatic throat-opening mechanism. It will also be recalled that when the traveling carriage is out of columnar position the machine releasing mechanism is locked against operation and moving the traveling carriage into columnar position renders this lock ineffective. Depressing the auxiliary starting bar also renders the above locking means, for the machine releasing means, ineffective making it possible to operate the machine and the automatic throat-opening mechanism irrespective of the columnar position of the traveling carriage. The auxiliary starting bar and associated mechanism will now be described.

Calling attention to Figs. 2, 3 and 12, an auxiliary starting bar 361 is mounted adjacent the sub-overdraft key 204 and the lower end of said bar is pivotally connected to a bar 362 slidably mounted by means of parallel slots therein, in cooperation with studs 363 and 364 in a plate 365 secured to the frame 105 by means of various studs and screws. A spring 366 (Fig. 12) tensioned between the stationary stud 363 and the bar 362 urges said bar and the auxiliary starting bar 361 upwardly to undepressed position, which is determined by the slot in the upper end of the bar 362 in cooperation with the stud 363.

Depressing the auxiliary starting bar 361 (Figs. 2 and 16) through the medium of a stud 367 therein, in cooperation with an arm 368 secured on the shaft 177 rocks said shaft and the lever 176 counter-clockwise, causing the stud 178 to rock the latch 142 out of engagement with the stud 144, to permit the notch 122 in the link 123 to be engaged by the stud 121 upon subsequent operation of the machine.

Depressing the auxiliary starting bar 361 (Figs. 2 and 14) causes an extension 370 thereon, in cooperation with a stud 371 in an arm 372 of the locking plate 241, to rock said locking plate clockwise against the action of the spring 242 to move the shoulder 244 out of the path of the stud 245 to free the plate 129 for releasing movement. The arm 372 of the plate 241 is similar in contour to the arm which carries the stud 240 (Fig. 14) and which it will be remembered, is connected by the associated mechanism, here shown, to stops mounted on the traveling carriage, which rock the locking plate 241 to ineffective position when the traveling carriage is in predetermined columnar positions.

In addition to rendering the automatic throat-opening mechanism effective and unlocking the release plate 129, depressing the auxiliary bar 361 also sets the machine in motion to cause the shaft 119 (Fig. 16) to actuate the throat-opening mechanism in the manner explained previously.

Depressing the auxiliary starting bar 361 (Fig. 12) carries the bar 362 downwardly in unison therewith to move a notch 373, in said bar, opposite a bent-over ear 374 on a bell crank 375 fulcrumed on the stud 364 thereby permitting a spring 376 to rock said bell crank clockwise, to engage said ear with said notch. Clockwise movement of the bell crank 375 causes a stud 377 therein, in cooperation with an extension of a multi-armed lever 378 free on the shaft 133, to rock said lever counter-clockwise against the action of a spring 379. Counter-clockwise movement of the lever 378, (Figs. 12 and 13) causes an arm 30 thereof, in cooperation with an extension 381 of a link 382, to shift said link upwardly. The lower end of the link 382 is connected to an arm of a yoke 383 free on a rod 384 supported by a yoke 385 loose on a rod 388 supported by a bracket 389 secured to the base 34, and the upper end of said link 382 (Fig. 1) is pivoted to a lever 386, fulcrumed on a stud 387 in the case 31.

An arm 390 (Figs. 12 and 13) of the yoke 383 is pivotally connected, by a toggle link 931, to a cam lever 392, having a cam slot 393 which cooperates with a roller 394 mounted on the motor framework 114. A strong spring 395 normally maintains a raised surface of the link 391 in contact with an extension of the arm 390.

Upward movement of the link 383, which is effected as explained above, by depressing the auxiliary starting bar 361, rocks the yoke 383 counter-clockwise on its pivot rod 384, the yoke 385 being restrained against moving in unison with said yoke 383 by a spring 396, which normally maintains the rod 384 in contact with an extension 397 of the bracket 389. Counter-clockwise movement of the yoke 383 shifts the lever 392 upwardly, causing the cam slot 393, in cooperation with the roller 394, to move a roller 398, mounted on the lower end of said lever 392, into the path of a cam block 399 secured to the clutch driving member 113, which it will be recalled is geared to the constantly running electric motor 107.

During revolution of the driivng member 113, the segment 399 engages the roller 398 and rocks the lever 392 clockwise, the roller 394, in cooperation with the slot 393, serving as a fulcrum for said lever. As the spring 395 is sufficiently strong to overcome the action of the spring 396, clockwise movement of the lever 392 shifts the yoke 383 rearwardly to rock the yoke 385 counter-clockwise, which movement, by means of a link 400, the lower end of which is pivoted to an extension of the yoke 385 and the upper end of which is slotted to receive a stud 401 in an arm 402, secured on a shaft 403, journalled in the frames 105 and 106, rocks said arm 402 clockwise. The upper end of the arm 402 is bifurcated to receive a stud 405 in the plate 129 said stud 405 also forming an anchor for one end of the spring 141. Consequently clockwise movement of the arm 402 rocks the plate 129 counter-clockwise to release the machine for operation in the manner explained in connection with Fig. 2.

In case the plate 129 (Fig. 12) is held against counter-clockwise releasing movement, for example, when the lock lever 243 (Fig. 14) is rendered effective, either by the journal sheet being exhausted or by the platen being in front feeding position, the flexible connection formed by the toggle link 391 and the spring 395 permits the lever 392 to move independently of the yokes 383 and 385 when the cam segment 399 contacts the roller 398, thereby preventing injury to the parts comprising this mechanism. When the machine is set in motion by means other than the auxiliary starting bar 361, counter-clockwise releasing movement of the plate 129 causes the stud 401 to move idly in the slot in the upper end of the link 400, without imparting any movement to said link and its associated parts.

The auxiliary starting bar 361 (Fig. 12) is retained in depressed position during machine operations by the ear 374 of the bell crank 375, in cooperation with the notch 373. Initial movement counter-clockwise of the main shaft 109 causes a stud 406 in a bell crank 407, secured to said shaft to by-pass a spring-pulled shoe 408, pivotally connected to an arm of the lever 378. Return movement clockwise of the shaft 109 causes the stud 406 in cooperation with the sole of the shoe 408 to rock the lever 378 clockwise, which movement by means of an extension thereof, in cooperation with the stud 377 rocks the bell crank 375 counter-clockwise to disengage the ear 374 from the notch 373 to permit the spring 366 to return the auxiliary starting bar 361 upwardly to undepressed position. When the stud 406 moves beyond the shoe 408 the ear 374 comes to rest on the edge of the bar 362.

Novel non-repeat mechanism has been provided for preventing repeat operations of the machine when the auxiliary starting bar 361 is accidentally or inadvertently retained depressed at the end of machine operations.

The non-repeat mechanism includes an arm 409 pivoted at 424 to the plate 365 and urged clockwise by a spring 410 into contact with a stop stud 411, which positions an abutment 404 of said arm in the path of the bent-over ear 374 of the bell crank 375. Pivoted on the bar 362 is an arm 412 urged clockwise by a spring 413, to normally cause a hump thereon to resiliently obstruct the notch 373 from entrance of the ear 374, and to maintain a bent-over ear 414 thereof in engagement with a notch 415 in the arm 409.

Depressing the auxiliary starting bar 361, and incidental downward movement of the bar 362, causes the ear 414 to engage the bottom of the slot 415 to rock the lever 409 counter-clockwise out of the path of the ear 374. When the notch 373 moves opposite the ear 374 clockwise movement of the bell crank 375, under influence of the spring 376, causes said ear to rock the arm 412 counter-clockwise to disengage the ear 414 from the slot 415 to release the arm 409 to the action of the spring 410, which tends to return said arm 409 in a clockwise direction, but is prevented from doing so by the ear 374 which overlies the abutment 404.

If the bar 361 is retained depressed at the end of machine operation, return movement counter-clockwise of the bell crank 375 removes the ear 374 from the notch 373 and from above the surface 404 to permit the arm 409 to be spring-returned into the path of said ear 374 to obstruct clockwise movement of the bell crank 375, under influence of the spring 376, thereby preventing a repeat operation of the machine. The contour of the top of the surface 404 is such that the arm 409 moves upwardly sufficiently to prevent the ear 414 from moving into the slot 415, thereby making it necessary to release the auxiliary starting bar 361 to engage the ear 414 with the slot 415 before the machine can again be operated. A similar nonrepeat mechanism is provided for the vertical feed starting bar 281.

Camming lugs on stops 416, only one here shown, (Fig. 1) located in predetermined columnar positions on the bar 230, in cooperation with an upturned projection 417 of the lever 386, rock said lever counter-clockwise when the traveling carriage is tabulated to said predetermined columnar positions to lift the link 382 (see also Fig. 12) to cause the machine to operate automatically in exactly the same manner as when the auxiliary starting bar 361 is depressed. However, this mechanism does not disengage the latch 142 (Fig. 16) and consequently the automatic throat opening mechanism remains inoperative when the machine is thus operated.

*Operation*

It is believed that an understanding of the mode of operation of the present machine will have been obtained from a perusal of the foregoing specification, however, it is felt that a brief outline of the sequence of operation will not be amiss at this time.

First the auxiliary pressure rollers 247 (Figs. 7 and 15) are manually swung clear of the platen roll 44 and the journal sheet 246 and its superimposed carbon paper are inserted at the back of the platen and guided by the table 36 are wound around the platen roll until the upper end thereof passes beyond the auxiliary pressure rollers 247, after which said auxiliary pressure rollars are returned to effective positions, as shown in Fig. 15. Inserting the journal sheet in the machine moves the feelers 248 from the dot and dash position, shown in Fig. 15, to the full line position, which movement, by means of the mechanism pictured in Fig. 14, moves the latch lever 243 to ineffective position. As previously stated, the journal sheet is long enough to receive all the entries for a certain business period; for example, one day.

Next the operating motor is switched on, and runs continuously while the machine is in use. If the front feed throat isn't open the operator depresses the auxiliary starting bar 361 (Fig. 2) to open said throat. Next the first ledger sheet 418 (Fig. 1) is removed from a conveniently located stack, inserted within the open-throat and adjusted in relation to the printing line by means of the line-finding device, after which the throat is closed by depressing the bar 100 (Fig. 6).

With the traveling carriage in its extreme right-hand or starting position the old balance of this particular customer is ascertained from the last entry in the right-hand column of the ledger sheet, set up on the amount keys, after which an operation of the machine is initiated by depressing the starting bar 128. During operation of the machine the old balance is printed in the first column of the ledger sheet and simultaneously added into the previously cleared balance totalizer, and if desired may be simultaneously added in one or more of the adding totalizers. After this operation the traveling carriage tabulates automatically to the credit column. Next the first charge or debit item is set up on the keyboard, and upon operation of the machine is printed in the debit column and simultaneously subtracted from the old balance, contained in the balance totalizer. If more than one debit item is to be entered in the debit column the vertical feed starting bar 281 (Fig. 2) is used to initiate operation of the machine. This prevents tabulation of the traveling carriage and causes the platen roll to be rotated to line-space the ledger and journal sheets. By using the vertical starting bar, as many debit items as desired may be entered, one under the other, in the debit column. If there is only one debit item or when the last debit item is being entered in the debit column, the starting bar 128 is used to initiate operation of the machine to cause the traveling carriage to tabulate automatically to the credit column on the ledger sheet 418.

Next the first credit item is set up on the keyboard, and upon operation of the machine this item is printed upon the ledger and journal sheets and simultaneously added to the amount contained in the balance totalizer. If there is more than one credit item, the vertical starting bar 281 is used in exactly the same manner as explained for a plurality of debit items. After all the credit items have been entered, the traveling carriage automatically tabulates to the balance column of the ledger sheet.

The No. 1 total or balance key 147 (Fig. 3) is then depressed to select and condition the balance totalizer for a clearing operation and the machine is released for operation by depressing the starting bar 128. During operation of the machine, the #1 or balance totalizer is cleared and the new balance is simultaneously printed in the balance column of the ledger sheet 418 and upon the journal sheet. Depressing the #1 total key renders the mechanism shown in Figs. 3 and 16 effective to cause the throat of the front feed platen to open automatically at the end of a balance operation so that the ledger sheet may be removed and a new ledger sheet inserted in the open-throat. At the end of balance operations the traveling carriage tabulates automatically a slight distance beyond the balance column to render the automatic return mechanism effective, which immediately returns said carriage to starting position.

If the balance totalizer is in an overdrawn condition after the debit and credit items have been entered therein, the operator is notified of this fact by the locking of the No 1 total key against depression and the same mechanism that locks the No. 1 total key unlocks the overdraft and sub-overdraft keys 179 and 204. If no further computation is necessary in this particular account, the operator depresses the overdraft key 178, which conditions and initiates an overdraft operation during which the complementary amount of the overdraft is transposed to a true negative amount and printed upon the ledger and the journal sheets.

In the mode of operation being described, there is no necessity for further computations in connection with an overdrawn account; however, in systems requiring further computation in connection with overdrawn accounts, depressing the sub-overdraft key 204 initiates a sub-overdraft operation during which the complementary amount of the overdraft is transposed to a true negative amount and printed upon the ledger and journal sheets and the complementary amount of the overdraft is reentered in the balance totalizer in preparation for further computations in connection with this particular account.

The machine embodying the instant invention is very flexible in nature, and for that reason is adaptable for use in connection with the various systems employed by the majority of present-day business establishments. Therefore it is not the intention or desire to limit this machine to any particular business or to any particular business system.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a traveling carriage having a rockable platen adapted to be rocked from working position to open-throat position for the insertion and removal of record material; main operating means; normally ineffective means operated by the main operating means while the carriage remains stationary to rock the platen to open-throat position; devices to control operations of the machine; and means under the sole control of the control devices to render the rocking means effective to cause the throat to open.

2. In a front feed machine of the class described, the combination of a traveling carriage; a rockable platen supported by the traveling carriage, said platen adapted to be rocked from printing position to front feeding position for the removal and insertion of record material; means to rock the platen to front feeding position; means to operate the rocking means; manipulative devices to condition the machine for various operations; and means rendered effective solely under control of the manipulative devices to connect the rocking means to its operating means to cause the platen to be rocked to front feeding position.

3. In a front-feed machine of the character described, the combination with a traveling carriage and a platen supported by the traveling carriage, said platen movable from printing position to open-throat position to facilitate the removal and insertion of record material, of means to move the platen to open-throat position; means to operate the moving means; means to connect the operating means to the moving means; control devices for the machine to determine the type of operation to be performed; and means settable by the control devices to selectively render the connecting means effective to cause the platen to be moved to open-throat position during certain types of machine operations regardless of the position of the carriage.

4. In a front-feed machine of the class described, the combination with a traveling carriage and a platen supported by the traveling carriage, said platen movable from printing position to a more accessible position to facilitate the removal and insertion of record material, of means to move the platen to its more accessible position; means to operate the moving means; means to connect the moving means to the operating means; means to retain the connecting means in ineffective position; machine control devices; and means differentially settable by the control devices for rendering the retaining means ineffective to cause the platen to be moved to its more accessible position during a machine operation when certain of the machine control devices are actuated.

5. In a front-feed machine of the class described, the combination with a traveling carriage, a rockable platen carrying frame supported by said traveling carriage, and a main operating mechanism, of means, normally disconnected from said main operating mechanism but adapted to be operated thereby during a regular cycle thereof, for rocking the platen frame from a normal position to a front feeding position to facilitate the removal and insertion of record material; machine control devices; and means rendered effective by the machine control devices to connect the rocking means to the main operating mechanism to cause the platen frame to be rocked to front feeding position during an operation of the machine in which certain of the machine control devices are in operated position.

6. In a front feed machine of the character described, having a traveling carriage, comprising a portion movable from a normal position to a more accessible position to permit ready removal and insertion of record material, the combination of a main operating mechanism; a member adapated to be given a definite movement by said main operating mechanism during each operation of the machine; a contrivance connected to the carriage and yieldingly urged into engagement with the member; means to hold the contrivance out of engagement with the member; a plurality of elements for controlling operation of the machine, and means controlled by said elements to render the holding means ineffective to permit the contrivance to engage the member to cause the movable portion of the carriage to be moved to its more accessible position.

7. In a front feed machine of the class described, the combination with operating mechanism for the machine, a traveling carriage and a rockable platen supported by said carriage, said platen normally in printing position but adapted to be moved to a more accessible position to facilitate the removal and insertion of record material, of a member adapted to be given a definite cycle of movement upon each operation of the operating mechanism, platen rocking means adapted to be operated by the member, said platen rocking means comprising an element engageable with the member; means to hold the element out of engagement with the member; manipulative devices to control operation of the machine; and means rendered effective by the manipulative devices to move the holding means to ineffective position to permit the element to engage the member, whereupon operation of the machine causes the platen to be rocked to its more accessible position.

8. In a machine of the class described, the combination of record material supporting means, including a rockable platen; means to rock the platen from working position to a more accessible position for the removal and insertion of record material; means to operate the rocking means; normally ineffective means to connect the operating means to the rocking means; and means independent of the record material supporting means to render the connecting means effective to cause the platen to be rocked to its more accessible position.

9. In a machine of the character described, the combination of record material supporting means, including a rockable platen; means to rock the platen from working position to a more accessible position for the removal and insertion of record material; a main operating means for the machine; means to connect the main operating means to the platen rocking means; a latch normally effective to retain the connecting means in ineffective position; and means independent of the record material supporting means to disengage the latch to cause the platen to be rocked to its more accessible position.

10. In a machine of the class described, the combination of record material supporting means, including a rockable platen; means to rock the platen from working position to a more accessible position for the removal and insertion of record material; means to operate the rocking means; normally ineffective means to connect the operating means to the rocking means; means, independent of the record material supporting means, to render the connecting means effective to cause the platen to be rocked to its more accessible position; means to lock the platen in its more accessible position; and manipulative means to render the locking means ineffective and to return the platen to its working position.

11. In a front-feed machine of the character described, the combination of record material supporting means, including a rockable platen; means to rock the platen from working position to front feeding position to facilitate the removal and insertion of record material; main operating means for the machine means actuated by the main operating means, to operate the rocking means during a machine operation; normally ineffective means to connect the rocking means to the last-named operating means; means operable independent of the record material supporting means, to render the connecting means effective to cause the platen to be rocked to front-feeding position during the machine operation; means including various guides adapted to form a throat when the platen is in front-feeding position to guide record material around said platen; pressure rollers to hold the record material in contact with the platen, when said platen is in working position; means to latch the platen in front-feeding position; means, effective when the platen arrives in front-feeding position to move the pressure rollers away from said platen so that record material may be inserted in the open-throat, said moving means also adapted to effectuate the latching means; and manipulative means cooperating with the above moving and effectuating means to move the pressure rollers toward the platen, to render the locking means ineffective and to rock the platen to working position.

12. In a front-feed machine of the character described, the combination of a record material supporting means, including a movable platen; means to move the platen from working position to front-feeding position to facilitate the removal and insertion of record material; means to operate the moving means; normally ineffective means to connect the moving means to the operating means; a plurality of control devices; a member adapted to be moved to various positions by the control devices; and means cooperating with the member and effective when said member is in certain positions to render the connecting means effective.

13. In a front feed machine of the class described, the combination of a record material supporting means including a movable platen; means to move the platen from working position to front-feeding position to facilitate the removal and insertion of record material; means to operate the moving means; normally ineffective means to connect the moving means to the operating means; a plurality of manipulative devices to control operation of the machine: a member adapted to be moved to a corresponding one of a series of positions by each manipulative device; an element cooperating with the member; and means whereby the element renders the connecting means effective when the member is in certain positions.

14. In a machine of the class described, the combination of a record material supporting means, comprising a rockable platen; means to rock the platen from working position to front-feeding position to facilitate the insertion and removal of record material; means to operate the rocking means, said operating means normally disconnected from said rocking means; a plurality of manipulative devices to control operation of the machine; a member adapted to be moved to a corresponding one of a series of positions by each manipulative device; an element adapted to engage the member after said member has been positioned; and means actuated by the element when the member is in certain predetermined positions to connect the operating means to the rocking means to cause the platen to be automatically rocked to front-feeding position.

15. In a front-feed machine of the class described, the combination of a record material supporting means comprising a rockable platen; means to rock the platen from working position to front feeding position to facilitate the insertion and removal of record material; means to operate the rocking means; normally ineffective means to connect the rocking means to the operating means; a plurality of manipulative devices to control operation of the machine; a positionable member; means whereby the manipulative devices position the member in proportion thereto; means to hold the member against displacement after said member has been positioned by the manipulative devices; and means actuated by the holding means, when the member is in certain predetermined positions, to render the connecting means effective to cause the platen to be moved to front-feeding position.

16. In a front-feed machine of the character described, the combination of a record material supporting means comprising a movable frame; means to move the frame from working position to front-feeding position to facilitate the insertion and removal of record material; means to operate the moving means; normally ineffective means to connect the moving means to the operating means; a plurality of manipulative devices to control operation of the machine; a positionable member; means including a slide operated by the manipulative devices to move the member to a position corresponding to the effective manipulative device; means to hold the member against displacement, after said member has been positioned by the effective manipulative device; and means operated by the element, when the member is in certain positions, to render the connecting means effective to cause the frame to be moved to front-feeding position.

17. In a front-feeding machine of the class described, the combination of a record material supporting means including a rockable platen; means to rock the platen from working position to front feeding position to facilitate the removal and insertion of record material; a prime mover to operate the machine and the rocking means; means to connect the prime mover to the rocking means; means to latch the connecting means in ineffective position; a plurality of depressible keys to control operation of the machine; a positionable member; means including a slide operated by the keys to move the member to a position corresponding to the depressed key; means to hold the member against displacement after it has been positioned by the depressed key; and means actuated by the holding means when the member is in certain positions to render the latch ineffective to cause the platen to be rocked to front-feeding position.

18. In a machine of the class described, the combination of a record material holding means, including a rockable platen; means to rock the platen from printing position to front-feeding position to facilitate the removal and insertion of record material; common operating means for the machine and the rocking means; normally ineffective means to connect the rocking means to the operating means; a plurality of depressible keys to condition the machine for certain operations; a slide positioned by the keys; a member connected to the slide and positioned thereby in accordance with the depressed key, a projection on the member; an element having deep and shallow notches therein corresponding to the various positions of the member; yieldable means, effective upon operation of the machine, to engage the corresponding one of the notches with the projection to retain the member in set position; and means actuated by the element, when a deep notch engages the projection, to render the connecting means effective to cause the platen to be rocked to front-feeding position.

19. In a machine of the class described, the combination of a record material holding means including a rockable platen; means to rock the platen from printing position to front-feeding position to facilitate the removal and insertion of record material; common operating means for the machine and the rocking means; normally ineffective means to connect the rocking means to the operating means; a plurality of depressible keys to condition the machine for certain operations; a slide positioned by the keys; a member connected to the slide and positioned thereby in accordance with the depressed key; a projection on the member; an element having notches therein corresponding to the various positions of the member; means effective upon operation of the machine to move the element to engage the notch corresponding to the position of the member with the projection to retain said member in position; and means operated by the element upon movement thereof to effective position and when certain keys are depressed, to render the connecting means effective to cause the platen to be rocked to front-feeding position.

20. In a machine of the class described, the combination of a record material supporting means, comprising a part movable from working position to front-feeding position to facilitate the removal and insertion of record material; means to move the part to front-feeding position; means to operate the machine and the moving means; normally ineffective means to connect the moving means to the operating means; a depressible key to condition the machine for a certain operation; a slide positioned by the key; a member positioned by the slide; a projection on the member; an element having a notch therein adapted to engage the projection when the member is positioned by the slide; means actuated by the operating means to move the element to engage the notch with the projection to retain the member in position; and means operated by the element upon movement thereof to engaging position to render the connecting means effective to cause the part to be moved to front-feeding position.

21. In a front-feed machine of the class described, the combination of a record material supporting means including a rockable platen; means to rock the platen from printing position to front-feeding position to facilitate the removal and insertion of record material; common operating means for the machine and the rocking means; normally ineffective means to connect the rocking means to the operating means; a plurality of depressible keys to condition the machine for certain operations; a slide positioned by the keys; a member connected to the slide and positioned thereby in accordance with the depressed key; a projection on the member; an element having notches therein corresponding to the various positions of the member; means to move the element to engage the notch corresponding to the position of the member with the projection to retain the member in position; means operated by the element upon movement thereof to engaging position to effectuate the connecting means to cause the platen to be rocked to front-feeding position; a normally ineffective shiftable part on the element adapted to cooperate with the projection to render said element ineffective to effectuate the connecting means; and a manipulative device to move the shiftable part to effective position.

22. In a front-feeding machine of the class described, the combination of a record material holding means including a rockable platen; means to rock the platen from printing position to front-feeding position to facilitate the removal and insertion of record material; common operating means for the machine and the rocking means; normally ineffective means to connect the rocking means to the operating means, a plurality of depressible keys to condition the machine for certain operations; a slide positioned by the keys; a member connected to the slide and positioned thereby in accordance with the depressed key; a projection on the member; an element having notches therein corresponding to the various positions of the member; means to move the elements to engage the notch corresponding to the position of the member with the projection to retain the member in position; means operated by the element upon movement thereof to engaging position to cause the platen to be rocked to front-feeding position; and means comprising a normally ineffective shiftable part mounted on the element and manipulative means to move said shiftable part to effective position to prevent the element from effectuating the connecting means.

23. In a front-feed machine of the class described, the combination of a record material holding means including a rockable platen; means to rock the platen from working position to front feeding position to facilitate the removal and insertion of record material; common operating means for the machine and the rocking means; means to connect the rocking means to the operating means; a latch, normally effective, to hold the connecting means out of engagement with the rocking means; a plurality of depressible keys to condition the machine for certain operations; slide positioned by the keys; a member connected to the slide and positioned thereby in accordance with the depressed key; a projection on the member; an element having deep and shallow notches therein, said notches adapted to cooperate with the projection to retain the member in set position; yieldable means, effective upon operation of the machine, to move the element to retaining position; means actuated by the element, when a deep notch engages the projection, to move the latch to ineffective position to cause the platen to be rocked to front-feeding position; a slide on the element, cooperating with the notches; and manipulative means to move the slide to partially close the notches to prevent the element from actuating the latch moving means.

24. In a front-feeding machine of the class described, the combination of a record material supporting means adapted to be moved from working position to a more accessible position for the removal and insertion of record material; means to move the record material supporting means to its more accessible position; power means to operate the machine and the moving means; means to connect the moving means to the power means; a latch to hold the connecting means in ineffective position; a plurality of depressible keys to control the operation of the machine; a slide positioned by the keys; a member positioned by the slide in proportion to the depressed key; an element adapted to retain the member in set position; means actuated by the element when the member is in certain positions to move the latch to ineffective position to cause the record material supporting means to be moved to its more accessible position; a manipulative device; and means whereby the manipulative device renders the element ineffective to actuate the moving means for the latch.

25. In a machine of the class described, the combination of record material supporting means including a platen adapted to be rocked from printing position to front-feeding position to facilitate the insertion and removal of record material; means to rock the platen to front-feeding position; a continuously running power means for operating the machine and the platen rocking means; means to connect the power means to the machine; means to effectuate the above connecting means to initiate machine operation; means to connect the platen rocking means to the machine; manipulative devices to control operation of the machine; and means whereby the manipulative devices effectuate the connecting means for the platen rocking means to cause the platen to be rocked to front-feeding position during operation of the machine.

26. In an accounting machine, the combination of a record material supporting means adapted to be moved from printing position to front-feeding position to facilitate the insertion and removal of record material; means to move the record material supporting means from printing position to front-feeding position; means to operate the moving means; means to connect the moving means to the operating means; means to hold the connecting means out of engagement with the operating means; a manipulative device; and means, intermediate the manipulative device and the holding means, whereby operation of the manipulative device moves the holding means to ineffective position to cause the connecting means to engage the operating means, whereupon said operating means moves the material supporting means to front-feeding position.

27. In an accounting machine, the combination of a record material supporting means, comprising a platen adapted to be rocked from working position to front-feeding position to facilitate the removal and insertion of record material; means to rock the platen to front-feeding position; common power means to operate the machine and the rocking means; means to connect the power means to the machine; means to connect the rocking means to the machine; and a manipulative member to render both of the connecting means effective to operate the machine and to simultaneously cause the platen to be rocked to front-feeding position.

28. In an accounting machine, the combination of a record material supporting means, including a platen adapted to be rocked from working position to front-feeding position to facilitate the removal and insertion of record material; means to rock the platen to front-feeding position; means to operate the machine and the rocking means; normally ineffective means to connect the rocking means to the operating means; a continuously running power means to drive the operating means; means to connect the power means to the operating means; and a manipulative member to render both the connecting means effective to cause the platen to be rocked to front-feeding position.

29. In a machine of the class described, the combination of a record material supporting means including a platen adapted to be rocked from working position to front-feeding position to facilitate the removal and insertion of record material; means to rock the platen to front-feeding position; means to operate the machine and the rocking means; normally ineffective means to connect the rocking means to the operating means; a continuously running power device to drive the operating means; means to connect the power device to the operating means; normally effective means to lock the connecting means for the power device and the operating means in ineffective position; a manipulative member to move the locking means to ineffective position and to render both of the connecting means effective to initiate machine operation and to cause the platen to be rocked to front-feeding position.

30. In a machine of the class described, the combination of a record material supporting means, including a platen adapted to be rocked from working position to front-feeding position to facilitate the removal and insertion of record material; means to rock the platen to front-feeding position; means to operate the machine and the rocking means; normally ineffective means to connect the rocking means to the operating means; a continuously running power means to drive the operating means; means to connect the power means to the operating means; means to lock the connecting means for the power means and the operating means in ineffective position; a latch to hold the connecting means for the rocking means and the operating means in ineffective position; and a manipulative member, operation of which simultaneously moves the locking means and the latch to ineffective position, and renders the connecting means for the power means and the operating means effective to cause the platen to be rocked to front-feeding position.

31. In a front-feed machine of the class described, the combination of a record material supporting means comprising a platen rockable from printing position to front-feeding position to facilitate the removal and insertion of record material; means to rock the platen to front-feeding position; means to operate the machine and the platen rocking means; normally ineffective means to connect the operating means to the rocking means; a continuously running power contrivance to drive the operating means; a manually operable device to connect the power contrivance to the operating means to cause the machine to operate; a plurality of keys to control operation of the machine; a member positioned by the key; and means adapted to cooperate with the member upon operation of the machine to render the connecting means for the rocking means effective to cause the platen to be rocked to front-feeding position.

32. In a machine of the class described, having a traveling carriage supporting a rockable platen, said carriage adapted to be tabulated to various columnar positions, the combination of means to rock the platen from printing position to open-throat position to facilitate the removal and insertion of record material; means to operate the machine and the rocking means; power means to drive the operating means; normally ineffective means to connect the power means to the operating means; a touch bar to effectuate the connecting means; means to lock the connecting means in ineffective position; means effective when the carriage is in predetermined columnar positions to unlock the locking means, to permit operation of the machine; normally ineffective means to connect the rocking means to the operating means; a plurality of depressible keys to control operation of the machine; a member differentially positioned by the various control keys; and means comprising a notched element adapted to cooperate with the member upon operation of the machine, to render the connecting means for the rocking means effective when any one of certain control keys is depressed to cause the platen to be rocked to open-throat position.

33. In a machine of the character described, the combination with a traveling carriage, a rockable frame mounted in the carriage, and a platen roll supported by the rockable frame, of means to rock the frame to move the platen from printing position to open-throat position to facilitate the removal and insertion of record material around said platen; a bail running the length of the carriage and connected to the rockable frame; a finger cooperating with the bail; means to operate the finger; normally ineffective means to connect the finger to the operating means; a plurality of keys to control operation of the machine; and means whereby certain of the keys render the connecting means effective to cause the finger, in cooperation with the bail, to rock the frame to move the platen to open-throat position.

34. In a front-feed machine of the class described, comprising a traveling carriage having mounted therein a rockable frame supporting a platen roll, the combination of means to rock the frame to move the platen from printing position to open-throat position to facilitate the removal and insertion of record material around said platen; a bail running the length of the carriage and connected to the rockable frame; a finger cooperating with the bail; means to operate the machine and the finger; means to connect the finger to the operating means; means to hold the connecting means in ineffective position; a plurality of depressible keys to control operation of the machine; and means, including a member positioned by the keys and an element adapted to cooperate with the member upon operation of the machine, to move the holding means to ineffective position, when any one of certain keys is depressed, to move the platen to open-throat position.

35. In a machine of the class described, the combination of record material supporting means including a rockable platen; means to rock the platen from printing position to front-feeding position to facilitate the insertion and removal of record material; means to operate the machine and the platen rocking means; a continuously running power device to drive the operating means; means to connect the power device to the operating means; means to connect the rocking means to the operating means; normally ineffective means operated by the power device to effectuate the connecting means for the power and the operating means; and means to render the normally ineffective means effective and to simultaneously render the connecting means for the rocking and operating means effective to cause the platen to be rocked to front-feeding position.

36. In an accounting machine having a record material supporting means including a rockable platen, the combination of means to rock the platen from printing position to front-feeding position to facilitate the removal and insertion of record material; means to operate the machine and the platen rocking means; a continuously running power device to drive the operating means; a clutch including a driving member connected to the power means and a driven member connected to the operating means; means to engage the clutch members to initiate machine operation; means to connect the rocking means to the operating means; normally ineffective means adapted to be operated by the power device to render the engaging means effective; and a manipulative device, operation of which moves the normally ineffective means into cooperative relationship with the power device and simultaneously renders the connecting means for the rocking and operating means effective to cause the platen to be rocked to front feeding position.

37. In a front-feed machine of the class described having a record material supporting means including a rockable platen, the combination of means to rock the platen from printing position to front-feeding position to facilitate the removal and insertion of record material; means to operate the machine and the platen rocking means; a continuously running power means to drive the operating means; a clutch including a driving member connected to the power means and a driven member connected to the operating means; means to engage the two clutch members to initiate machine operation; means comprising an element to render the engaging means effective; a prominence on the driving member; and means to move the element into the path of the prominence, whereupon said prominence shifts said element to render the engaging means effective to cause the machine to operate, said moving means also adapted to render the connecting means for the rocking and the operating means effective to cause the platen to be rocked to front-feeding position.

38. In an accounting machine, the combination of a record material supporting means, including a rockable platen; means to rock the platen from printing position to front-feeding position to facilitate the insertion and removal of record material; means to operate the machine and the rocking means; a continuously running power means to drive the operating means; normally ineffective means to connect the power means to the operating means; means comprising a rockable plate to render the connecting means effective; means to connect the rocking means to the operating means; a latch to hold the connecting means for the rocking means in ineffective position; a normally effective latch to obstruct rocking movement of the plate; and a manipulative device, operation of which unlatches both the latches and simultaneously rocks the plate to cause the machine to operate and to cause the platen to be moved to front-feeding position.

39. In a machine of the class described having manipulative devices to control the machine for various types of operations, a printing element to designate type of operation performed, connections between the manipulative devices and the printing element and differentially settable by the manipulative devices, and a main operating means, the combination of a control member settable by said connections to a position corresponding to the operated manipulative device; a notched member cooperable with the control member and controlled in its operation by the main operating means; a carriage having a platen; a movable frame to support the platen; means to rock the frame to move the platen to an open-throat position to provide for easier insertion and removal of record material therein; means normally preventing the rocking means from being operated by the main operating means; and means on the notched member to disable the means normally preventing the rocking means from being operated so that the rocking means can be connected to the main operating means to selectively move the platen to open-throat position during a machine operation depending upon which manipulative device is operated prior to the machine operation.

40. In a machine of the class described having manipulative devices to control the machine for various types of operations, a printing element to designate type of operation performed, connections between the manipulative devices and the printing element and differentially settable by the manipulative devices, and a main operating means, the combination of a control member settable by said connections to a position corresponding to the operated manipulative device; a notched member cooperable with the control member and controlled in its operation by the main operating means; a carriage having a platen; a movable frame to support the platen; means to rock the frame to move the platen to an open-throat position to provide for easier insertion and removal of record material therein; means normally preventing the rocking means from being operated by the main operating means; means on the notched member to disable the means normally preventing the rocking means from being operated so that the rocking means can be connected to the main operating means to selectively move the platen to open-throat position during a machine operation depending upon which manipulative device is operated prior to the machine operation; and an element associated with the control member to render the control member ineffective at the option of the operator.

41. In a machine of the class described having manipulative devices to control the kind of operations to be performed by the machine, a printing element to designate the kind of operations to be performed, connections differentially settable under control of the keys to differentially position the printing element according to the manipulative device which is operated, a main operating means, alining means for the printing element movable different extents depending upon its manipulative device being manipulated, and means operated by the main operating means to control the operation of the alining means, the combination of a carriage for supporting record material having an open-throat and a closed-throat position; moving means operated by the main operating means to move the carriage to its open-throat position; a latch to normally maintain the last-named means disconnected from the main operating means; and means operated by the alining means as it moves one of said extents into position to aline the printing element to move the latch into ineffective position to cause the moving means to be connected to the main operating means under control of the manipulative devices.

42. In a machine of the class described having manipulative devices to control the kind of operations to be performed by the machine, a printing element to designate the kind of operations to be performed, connections differentially settable under control of the keys to differentially position the printing element according to the manipulative device which is operated, a main operating means, alining means for the printing element movable different extents depending upon its manipulative device being manipulated, and means operated by the main operating means to control the operation of the alining means, the combination of a carriage for supporting record material having an open-throat and a closed-throat position; moving means operated by the main operating means to move the carriage to its open-throat position; a latch to normally maintain the last-named means disconnected from the main operating means; means operated by the alining means as it moves one of said extents into position to aline the printing element to move the latch into ineffective position to cause the moving means to be connected to the main operating means under control of the manipulative devices; the means cooperating with the alining means and positionable by the operator to prevent the alining means from moving said one extent to prevent the movement of the carriage to open-throat position at the option of the operator.

43. In a machine of the class described, the combination of manipulative devices to control the machine for different kinds of operations; a symbol-bearing device settable differentially under control of the manipulative devices to designate the kind of operation performed; an alining means to maintain the symbol in its differentially set position, said alining means movable different extents depending upon the symbol set up under control of the manipulative devices; a carriage movable from a closed-throat to an open-throat position; and means operated by the main operating means and controlled by the position of the alining means to determine whether the carriage is to be moved to its open-throat position during the machine operation.

44. In a machine of the class described having a carriage automatically movable from a closed-throat to an open-throat position, manipulative devices to determine the kind of operation to be performed by the machine; a main operating means for the machine; mechanism for automatically moving the carriage from its closed-throat into its open-throat position, said mechnism connectable to and disconnectable from the main operating means; and control means operable differentially under control of the manipulative devices to determine when said mechanism is to be operated by the main operating means.

45. In a machine of the class described having a traveling carriage movable across the machine for columnar tabulation and return, said carriage supporting a platen adjustable from a closed-throat to an open-throat position, the combination of manipulative devices; normally ineffective mechanism to automatically adjust the platen from its closed-throat to its open-throat position independently of any tabulating or return movement of, or of any position of, the carriage; power means to operate the machine; control means settable under the control of the manipulative devices to connect said platen-adjusting mechanism to the power means for operation thereby; and manipulative means operable to render the last-named means ineffective to thereby prevent automatic adjustment of the platen from its closed-throat to its open-throat position.

46. In a machine of the class described having a record material holding means movable back and forth across the machine, said holding means supporting a platen adjustable from a closed-throat to an open-throat position, the combination of manipulative devices; a main operating means for the machine; a normally inactive mechanism operable to adjust the platen from its closed-throat to its open-throat position independent of any of said movements of, or of any position of, the holding means; means to connect said mechanism to the main operating means of the machine to render the mechanism active; control means settable under control of the manipulative devices to determine when said mechanism is to be connected to the main operating means; and manipulative means to render the control means ineffective.

47. In a machine of the class described having a record material holding means movable back and forth across the machine, said holding means supporting a platen adjustable from a closed-throat to an open-throat position, and manipulative devices to control the machine for different kinds of operations, the combination of normally ineffective mechanism to adjust the platen from its closed-throat to its open-throat position independently of any of said movements of, or of any position of, the holding means; an operating means for said mechanism; means settable under control of the manipulative devices to cause the operating means to operate said mechanism to adjust the platen to its open-throat position; and manipulative means settable to disable the last-named means whereby said mechanism is prevented from adjusting the platen to its open-throat position.

48. In typewriting and accounting machines having a carriage laterally movable in opposite directions, and a paper-supporting platen mounted on the carriage and movable from closed-throat to open-throat position to permit the insertion of paper and back to closed-throat position, the combination of normally ineffective means, said means when effective acting to move said platen from closed-throat to open-throat position; manipulative means; connections adjusted by the manipulative means for rendering said means effective independent of any movement or position of the carriage; and means to render the connections ineffective regardless of the adjustment of the connections by the manipulative means.

49. In typewriting and accounting machines having a carriage laterally movable in opposite directions, a paper-supporting platen mounted on the carriage and movable from closed-throat to open-throat position to permit the insertion of paper and back to closed-throat position, manipulative devices, type carriers coacting with the platen to make impressions on the inserted paper, and variably adjustable connections between the manipulative devices and the type carriers to variably position the type carriers commensurate with the manipulative devices which are manipulated, the combination of normally ineffective means to move said platen from closed-throat to open-throat position; and means controlled by the connections when the connections are adjusted to certain positions to render the last-named means effective to move said platen from closed-throat to open-throat position.

50. In an accounting machine having a paper-supporting platen movable from a closed-throat to an open-throat position to permit the insertion of record material, and back to closed-throat position for making records on the record material, and type carriers differentially positioned to record varying data on the record material, the combination of differentially adjustable connections to position the type carriers; normally ineffective means to move the platen from the closed-throat to the open-throat position; and means controlled by the type carrier connections when adjusted to certain positions to render the last-named means effective.

51. In an accounting machine having a paper-supporting platen movable from a closed-throat to an open-throat position to permit the insertion of record material, and back to closed-throat position for making records on the record material, and type carriers differentially positioned to record varying data on the record material, the combination of differentially adjustable connections to position the type carriers, said connections including one element of an alining mechanism; means movable variable extents into engagement with said element to maintain the connections and type carriers in alinement during printing operations; normally ineffective means to move the platen from closed-throat to open-throat position; and means actuated by the first-named means when moved one extent as it moves into alining position to render the last-named means effective to move the platen from closed-throat to open-throat position.

52. In a typewriting and accounting machine having a carriage laterally movable in opposite directions, and a paper-supporting platen mounted on the carriage and movable from closed-throat to open-throat position to permit the insertion of paper and back to closed-throat position, the combination of a power means; normally ineffective connections intermediate the power means and the platen, said connections when effective acting to move said platen from closed-throat to open-throat position; a type carrier; manipulative devices; means differentially settable under control of the manipulative devices to differentially adjust the type carrier; and means controlled by the last-named means to render the said connections effective independent of any movement or position of the carriage.

53. In typewriting and accounting machines having a carriage laterally movable in opposite directions, and a paper-supporting platen mounted on the carriage and movable from closed-throat to open-throat position to permit the insertion of paper and back to closed-throat position, the combination of normally ineffective means which when effective acts to move said platen from closed-throat to open-throat position; manipulative means; a type carrier; connections differentially positioned by the manipulative means including an element settable commensurate with the setting of the type carrier; a member movable variable extents into engagement with said element; means operable when the member moves one extent to render said normally ineffective means effective independent of any movement or position of the carriage; means associated with the member and adjustable relatively thereto to control the member to move a different extent to maintain the normally ineffective means ineffective; and a manipulative device to adjust the means associated with the member.

54. In a machine of the class described having a traveling carriage movable across the machine for columnar tabulation and return, said carriage supporting a platen adjustable from a closed-throat to an open-throat position, the combination of manipulative devices; normally ineffective mechanism automatically to adjust the platen from its closed-throat to its open-throat position independently of any tabulating or return movement of the carriage; power means to operate the machine; and control means settable under the control of the manipulative devices to connect said platen-adjusting mechanism to the power means for operation thereby.

55. In a machine of the class described having a record material holding means movable back and forth across the machine, said holding means supporting a platen adjustable from a closed-throat to an open-throat position, the combination of manipulative devices; a main operating means for the machine; a normally inactive mechanism operable to adjust the platen from its closed-throat to its open-throat position independent of any of said movements of the holding means; means to connect said mechanism to the main operating means of the machine to render the mechanism active; and control means settable under control of the manipulative devices to determine when said mechanism is to be connected to the main operating means.

56. In typewriting and accounting machines having a carriage laterally movable in opposite directions, and a paper-supporting platen mounted on the carriage and movable from closed-throat to open-throat position to permit the insertion of paper and back to closed-throat position, the combination of a power means; normally ineffective connections intermediate the power means and platen, said connections when effective acting to move said platen from closed-throat to open-throat position; and manipulative means for rendering said connections effective independent of any movement or position of the carriage.

JOHN T. DAVIDSON.

DISCLAIMER

Re. 21,051.—*John T. Davidson*, Dayton, Ohio. ACCOUNTING MACHINE. Patent dated April 18, 1939. Disclaimer filed April 20, 1944, by the assignee, *The National Cash Register Company*.

Hereby enters this disclaimer to claims 1, 27, 44, 45, 46, 48, 54, 55, and 56 in said specification.

[*Official Gazette May 16, 1944.*]